US012717685B2

(12) United States Patent
Yamamoto et al.

(10) Patent No.: US 12,717,685 B2
(45) Date of Patent: Aug. 25, 2026

(54) DISTRIBUTED TRANSACTION MANAGEMENT DEVICE AND DISTRIBUTED TRANSACTION MANAGEMENT METHOD

(71) Applicant: Hitachi, Ltd., Tokyo (JP)

(72) Inventors: Nobuyuki Yamamoto, Tokyo (JP); Junpei Nishitani, Tokyo (JP); Hiroyuki Mochiduki, Yokohama City (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/586,889

(22) Filed: Feb. 26, 2024

(65) Prior Publication Data

US 2025/0103447 A1 Mar. 27, 2025

(30) Foreign Application Priority Data

Sep. 25, 2023 (JP) ................................ 2023-160237

(51) Int. Cl.
*G06F 16/00* (2019.01)
*G06F 11/1446* (2026.01)
*G06F 11/1474* (2026.01)

(52) U.S. Cl.
CPC ...... *G06F 11/1474* (2013.01); *G06F 11/1469* (2013.01); *G06F 2201/84* (2013.01)

(58) Field of Classification Search
CPC ............ G06F 11/1474; G06F 11/1469; G06F 2201/84
USPC .......................................................... 707/682
See application file for complete search history.

(56) References Cited

U.S. PATENT DOCUMENTS

| | | | | |
|---|---|---|---|---|
| 2010/0169284 | A1* | 7/2010 | Walter | G06F 11/2033 707/682 |
| 2011/0041006 | A1* | 2/2011 | Fowler | G06F 9/466 714/E11.131 |
| 2017/0310473 | A1* | 10/2017 | Takiguchi | H04L 9/085 |
| 2019/0235974 | A1* | 8/2019 | Pardon | G06F 11/2094 |
| 2024/0126747 | A1* | 4/2024 | Hasegawa | G06F 16/2379 |

FOREIGN PATENT DOCUMENTS

| | | | | |
|---|---|---|---|---|
| CN | 115617571 A | * | 1/2023 | G06F 11/1448 |
| EP | 1380948 A2 | * | 1/2004 | G06F 11/1474 |
| JP | 08-235039 A | | 9/1996 | |
| JP | H08286964 A | * | 11/1996 | |
| JP | 2010-157202 A | | 7/2010 | |

* cited by examiner

*Primary Examiner* — Monica M Pyo
(74) *Attorney, Agent, or Firm* — MATTINGLY & MALUR, PC

(57) ABSTRACT

A distributed transaction management device records a transaction settlement result log indicating a settlement result of a transaction in the distributed transaction system. When the distributed transaction management device receives a rollback processing completion notification from any one of multiple resource management units participating in the transaction, the distributed transaction management device deletes the transaction settlement result log of the rollback.

8 Claims, 23 Drawing Sheets

| TRANSACTION IDENTIFIER (112a) | SETTLEMENT RESULT (112b) | LIST OF RESOURCE MANAGEMENT IDENTIFIERS (112c) |
|---|---|---|
| 10 | COMMIT | RESOURCE MANAGEMENT UNIT1, RESOURCE MANAGEMENT UNIT2 |
| 11 | ROLLBACK | (NONE DUE TO ROLLBACK) |
| ⋮ | ⋮ | ⋮ |

| TRANSACTION IDENTIFIER (112a) | SETTLEMENT RESULT (112b) | LIST OF RESOURCE MANAGEMENT IDENTIFIERS (112c) | RECORDING TIME (112d) |
| --- | --- | --- | --- |
| 10 | COMMIT | RESOURCE MANAGEMENT UNIT1, RESOURCE MANAGEMENT UNIT2 | 00:00:02 |
| 11 | ROLLBACK | (NONE DUE TO ROLLBACK) | 00:00:05 |
| ⋮ | ⋮ | ⋮ | ⋮ |

1400

| TRANSACTION IDENTIFIER (1401) | SETTLEMENT RESULT (1402) | PROCESSING INFORMATION (1403) |
|---|---|---|
| 10 | R | |
| 11 | C | PROCESSED |
| 12 | C | PROCESSED |
| 13 | R | |
| 14 | UNUSED | |
| 15 | UNUSED | |
| 16 | UNUSED | |
| 17 | UNUSED | |
| 18 | UNUSED | |
| 19 | UNUSED | |

1300

| TRANSACTION IDENTIFIER RANGE (1301) | USAGE INFORMATION (1302) |
|---|---|
| 10—13 | USED |

| TRANSACTIO N IDENTIFIER | SETTLEMENT RESULT | PROCESSING INFORMATION |
|---|---|---|
| 14 | R | |
| 15 | C | PROCESSED |
| 16 | C | PROCESSED |
| 17 | R | |
| 18 | C | PROCESSED |
| 19 | C | PROCESSED |

| TRANSACTION IDENTIFIER RANGE | USAGE INFORMATION |
|---|---|
| 10—19 | USED |

2000

2001 2002 2003

| TRANSACTION IDENTIFIER | SETTLEMENT RESULT | PROCESSING INFORMATION |
|---|---|---|
| 10 | R | |
| 11 | C | PROCESSED |
| 12 | C | PROCESSED |
| 13 | R | |
| 14 | UNUSED | |
| 15 | UNUSED | |
| 16 | UNUSED | |
| 17 | UNUSED | |
| 18 | UNUSED | |
| 19 | UNUSED | |
| 20 | R | |
| 21 | C | PROCESSED |
| 22 | C | PROCESSED |
| 23 | C | PROCESSED |
| 24 | UNUSED | |
| 25 | UNUSED | |
| 26 | UNUSED | |
| 27 | UNUSED | |
| 28 | UNUSED | |
| 29 | UNUSED | |

1900

1901 1902

| TRANSACTION IDENTIFIER RANGE | USAGE INFORMATION |
|---|---|
| 10－13 | USED |
| 20－23 | USED |

2000

| TRANSACTION IDENTIFIER (2001) | SETTLEMENT RESULT (2002) | PROCESSING INFORMATION (2003) |
|---|---|---|
| 14 | R | |
| 15 | R | |
| 16 | R | |
| 17 | C | PROCESSED |
| 18 | C | PROCESSED |
| 19 | C | PROCESSED |
| 24 | R | |
| 25 | R | |
| 26 | R | |
| 27 | R | |
| 28 | R | |
| 29 | C | PROCESSED |

1900

| TRANSACTION IDENTIFIER RANGE (1901) | USAGE INFORMATION (1902) |
|---|---|
| 10—29 | USED |

DISTRIBUTED TRANSACTION MANAGEMENT DEVICE AND DISTRIBUTED TRANSACTION MANAGEMENT METHOD

CROSS-REFERENCE TO RELATED APPLICATION

The present application claims priority from Japanese application JP2023-160237, filed on Sep. 25, 2023, the content of which is hereby incorporated by reference into this application.

BACKGROUND OF THE INVENTION

1. Field of the Invention

This present invention relates to a distributed transaction management device and a distributed transaction management method.

2. Description of the Related Art

Microservices architecture is beginning to be adopted. Microservice architecture is an architectural style in which a software system is built as a collection of small independent services. Each service is responsible for a specific business function or set of functions, and each is executed as a unique process. Enterprise systems are also entering the scope of microservice architecture, and data integrity under distributed transactions that guarantee the integrity of data update processes across multiple services is becoming a necessity. For this reason, distributed transaction control functions for microservices are being developed.

XA is one of the representative specifications for the distributed transaction. XA uses a consensus protocol called two-phase commit to maintain data integrity among services. In this two-phase commit, if the transaction settlement is determined to be a commit, the log is persisted (the log is stored in a persistent storage), but if the transaction resolution is determined to be a rollback, the log is not persisted. If a recovery request is received with no log, it is determined to be a rollback.

Patent document 1 (Japanese Patent Application Laid-Open No. 2010-157202) and Patent document 2 (Japanese Patent Application Laid-Open No. H8-235039) disclose systems that perform transaction processing with two-phase commit.

In the case of conventional two-phase commit, in cloud or container environment, delays can cause processing order reversal (e.g., the order of arrival of a preparation vote and the recovery request) to be reversed. In this case, the decision to rollback of the recovery request and the preparation vote (YES to commit) is inconsistent. To maintain transactional integrity, the log should be persisted even if the decision is made to a rollback.

On the other hand, there is a limit to the amount of storage space used for log persistence, and after transaction processing is completed, the log must be deleted from storage to free up storage space. With conventional two-phase commit, this log deletion process itself is unnecessary in the case of rollback, but in the case of persistence, this process is newly required.

SUMMARY OF THE INVENTION

Therefore, a distributed transaction system that deletes a transaction settlement result log as follows is considered.

This distributed transaction system includes a distributed transaction management unit and multiple databases. In the first phase, the distributed transaction management unit records a commit in the transaction settlement result log if the transaction preparation process is successful in all databases and records a rollback in the transaction settlement result log if the transaction preparation process is not successful in all databases. In the second phase, the distributed transaction management unit instructs the databases to a commit or a rollback the settlement result (a commit or a rollback), and the databases commit or rollback. When the commit or rollback is completed in all databases, the distributed transaction management unit deletes the transaction settlement result log and releases the storage space.

In order to delete the transaction settlement result log, it is necessary to confirm that "all databases have committed or completed rollback". For this purpose, the distributed transaction management unit needs to know which databases are participating in the transaction.

In the case of a commit, it is a requirement that all databases report a successful preparation process to the distributed transaction management unit, so the distributed transaction management unit knows all the databases participating in the transaction.

On the other hand, in the case of a rollback, the distributed transaction management unit may not necessarily know all the databases participating in the transaction, since the preparation process success or the preparation process failure itself may not have reached the distributed transaction management unit due to timeouts or other reasons.

This makes it difficult to identify when to delete the transaction settlement result log because it is not possible to confirm that the rollback has been completed in all databases participating in the transaction. As a result, the storage space for the transaction log increases.

Note that there is a conventional technology (Patent document 1) that does not record rollback information. The conventional technology does not persist log when the transaction settlement is determined to be a rollback. The conventional technology determines a rollback when the recovery request is received with no log. This method does not have consistency issues when there is no conflict between the commit and recovery processes. However, it is not suitable for cloud and container environments with high latency, because it may conflict with the commit process and affect integrity.

Therefore, one of the purposes of the present invention is to provide a distributed transaction management device and a distributed transaction management method that can prevent an increase in transaction log storage space while guaranteeing the integrity of distributed transaction.

In order to solve the above problem, the present disclosed distributed transaction management device applies to a distributed transaction system in a specific environment. The distributed transaction management device comprises a storage device that records transaction settlement result log indicating a settlement result of a transaction of the distributed transaction system and an information processing device that manages the transaction settlement result log. The information processing device is configured to delete, when receiving a rollback process completion notification from any one of multiple resource management units participating in the transaction, the transaction settlement result log indicating a rollback.

The present disclosed distributed transaction management device applies to a distributed transaction system in a specific environment. The distributed transaction management device comprises a storage device that records transaction settlement result log indicating a settlement result of a transaction of the distributed transaction system and an information processing device that manages the transaction settlement result log. The information processing device is configured to delete, after a certain time has elapsed after transaction settlement of a rollback done due to a recovery request from any one of multiple resource management units participating in the transaction, the transaction settlement result log indicating the rollback.

The present disclosed distributed transaction management device applies to a distributed transaction system. The distributed transaction management device comprises a storage device that records transaction settlement result log indicating a settlement result of a transaction of the distributed transaction system and an information processing device that manages the transaction settlement result log. The processing device is configured to: use a transaction identification number having a large/small relationship as a transaction identifier to identify the transaction; convert a plurality of consecutive transaction identification numbers corresponding to a settled transaction into range information indicating a range of the consecutive transaction identification numbers; associate used information indicating that the information has been used with the converted range information to thereby compress the transaction settlement result log, so as to create a compressed log; and record the compressed log in the storage device.

The present disclosed distributed transaction management method applies to a distributed transaction system in a specific environment. The distributed transaction management method is executed by an information device comprising a storage device that records transaction settlement result log indicating a settlement result of a transaction of the distributed transaction system, the distributed transaction management method managing the transaction settlement result log. The distributed transaction management method includes deleting, when receiving a rollback process completion notification from any one of multiple resource management units participating in the transaction, the transaction settlement result log indicating a rollback.

The present disclosed distributed transaction management method applies to a distributed transaction system in a specific environment. The distributed transaction management method is executed by an information device comprising a storage device that records transaction settlement result log indicating a settlement result of a transaction of the distributed transaction system. The distributed transaction management method manages the transaction settlement result log. The distributed transaction management method includes deleting, after a certain time has elapsed after transaction settlement of a rollback done due to a recovery request from any one of multiple resource management units participating in the transaction, the transaction settlement result log indicating the rollback.

The present disclosed distributed transaction management method applies to a distributed transaction system in a specific environment. The distributed transaction management method is executed by an information device comprising a storage device that records transaction settlement result log indicating a settlement result of a transaction of the distributed transaction system. The distributed transaction management method manages the transaction settlement result log. The distributed transaction management method includes: using a transaction identification number having a large/small relationship as a transaction identifier to identify the transaction; converting a plurality of consecutive transaction identification numbers corresponding to a settled transaction into range information indicating a range of the consecutive transaction identification numbers; associating used information indicating that the information has been used with the converted range information to thereby compress the transaction settlement result log, so as to create a compressed log; and The present invention can prevent an increase in storage space for transaction log while guaranteeing the integrity of distributed transactions.

BRIEF DESCRIPTION OF DRAWINGS

FIG. 3 illustrates an example of log.

FIG. 8 is a flowchart showing a processing flow executed by the resource management unit.

FIG. 9 illustrates an example of log.

DETAILED DESCRIPTION OF THE PREFERRED EMBODIMENTS

Each embodiment of the present invention will be described below with reference to the drawings. In all figures of the embodiments, identical or corresponding parts may be marked with the same symbol. In the following descriptions, various types of information may be described using expressions such as "table," "record," "column," "row," etc., but various types of information may be expressed using data structures other than these. Furthermore, when describing identification information, expressions such as "identification number," "identifier," and "name" are used, but these can be substituted for each other. Furthermore, in the following explanations, the processing may be explained with a functional block as the subject, but the subject of the processing may be a CPU or a device instead of the functional block.

First Embodiment

Figure 1:
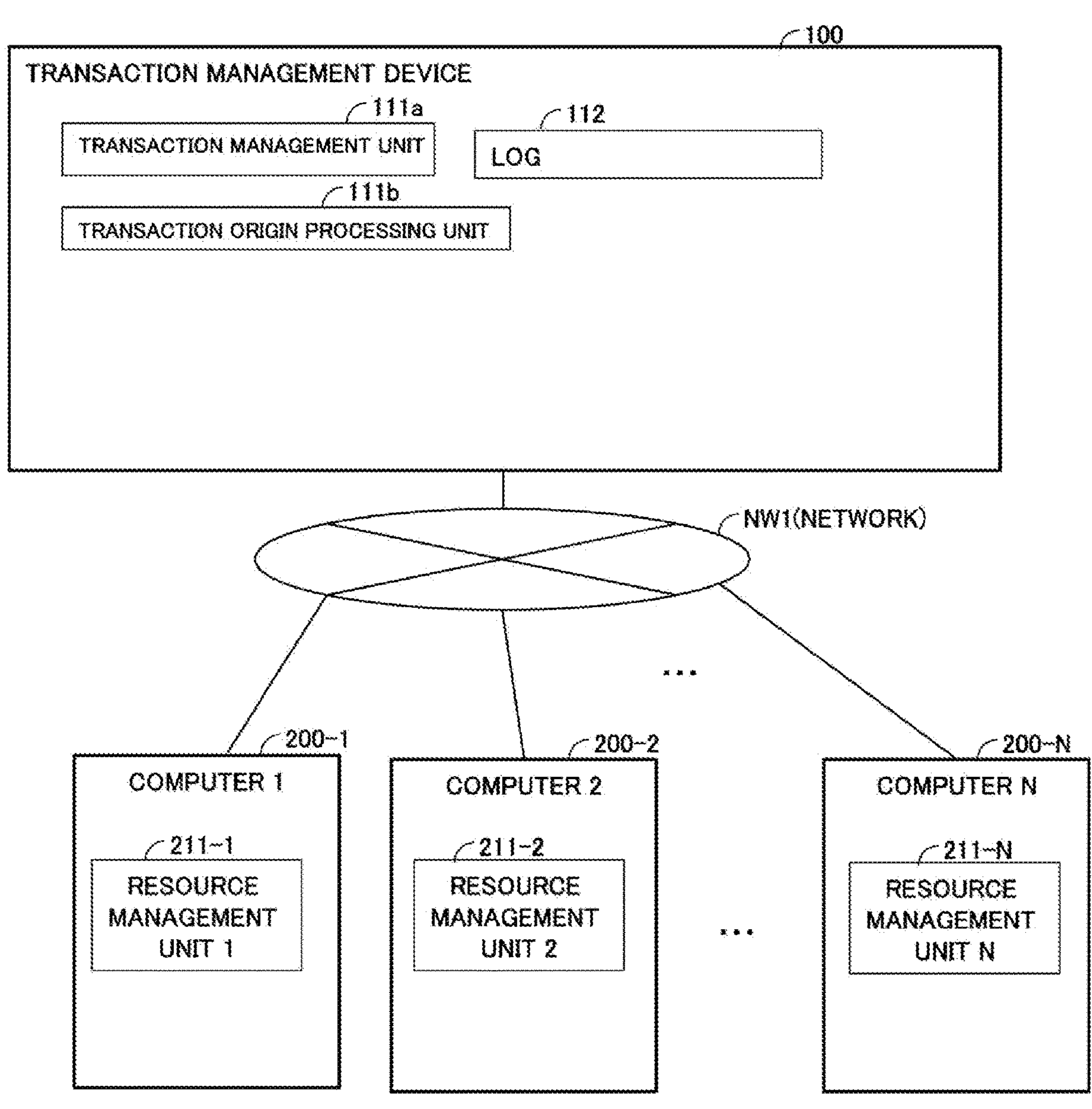
FIG. 1 is a system configuration diagram showing an example configuration of a system including a distributed transaction management device according to the first embodiment of the present invention.

FIG. 1 is a system configuration diagram showing an example configuration of a system (a distributed transaction system) including a distributed transaction management device 100 (hereinafter referred to as a "transaction management device 100") of the first embodiment of the present invention. As shown in FIG. 1, the system includes the transaction management device 100 and computers (1) 200-1 through (N) 200-N. The transaction management device 100 and the computers (1) 200-1 through (N) 200-N are connected to communicate with each other via a network NW1. The computers (1) 200-1 through (N) 200-N are hereinafter referred to as the "computer 200" when there is no need to distinguish between them. The computer (1) 200-1 through computer (N) 200-N include a resource management unit (1a) 211-1 through a resource management unit (N) 211-N. The resource management unit (1) 211-1 through (N) 211-N are referred to as the "resource management unit 211" when there is no need to distinguish between them. The system may be a microservice architecture system.

Figure 2:
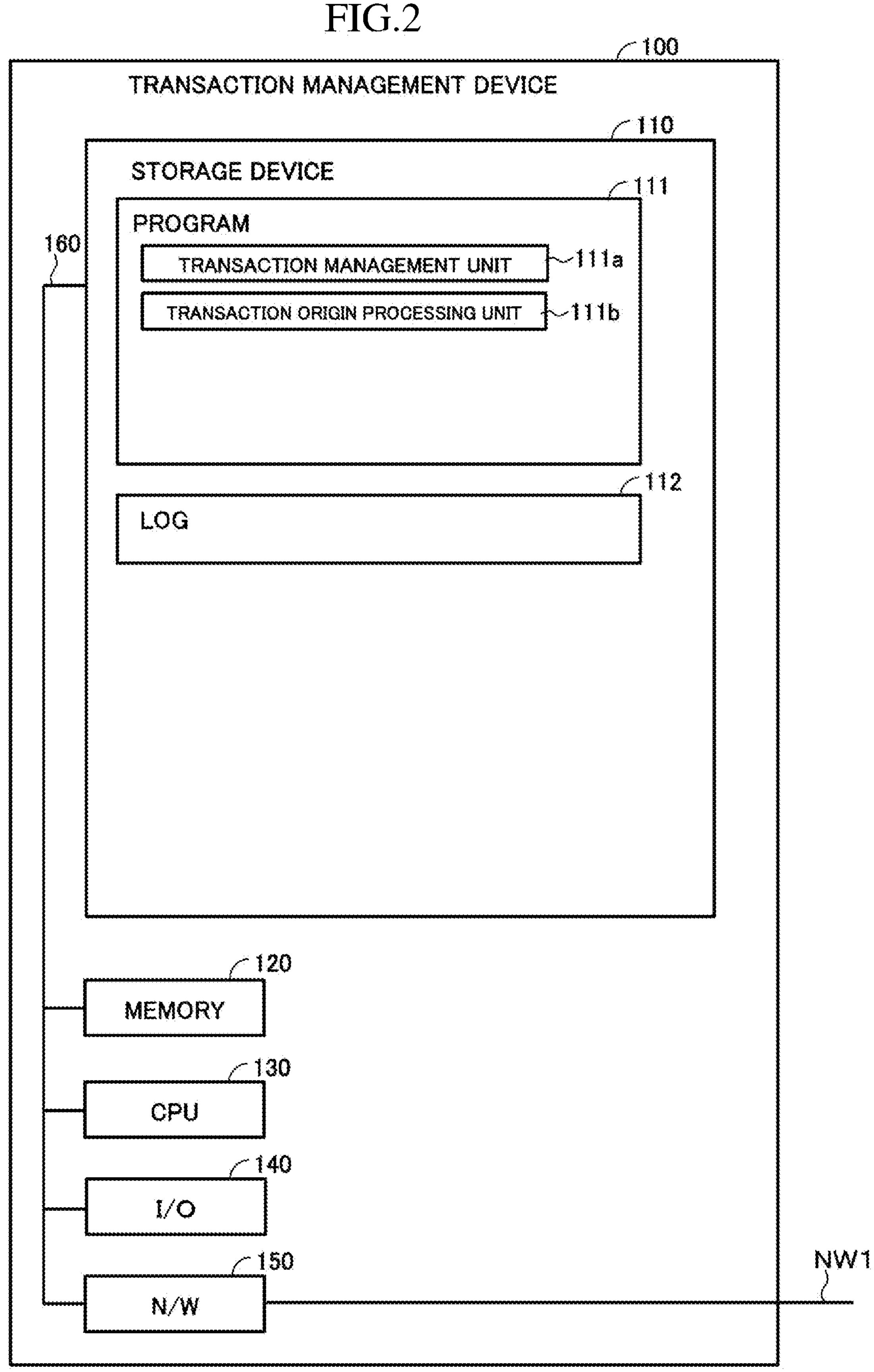
FIG. 2 shows a schematic diagram of an example configuration of a transaction management device.

FIG. 2 is a schematic diagram showing an example configuration of the transaction management device 100. As shown in FIG. 2, the transaction management device 100 includes a non-volatile storage device 110 capable of reading and writing data, a memory 120 (e.g., RAM), a CPU 130, an input/output interface 140, and a network interface 150. These are communicatively connected to each other via a bus 160.

The device including the CPU 130, the storage device 110, the memory 120, the input/output interface 140, the network interface 150, and the bus 160 is also referred to as an "information processing device" for convenience. The information processing device may be multiple information processing devices, a virtual information processing device built on cloud, or a virtual environment such as a container.

The storage device 110 holds (stores) a program 111 and log 112. The program 111 includes a transaction management unit 111*a* and a transaction origin processing unit 111*b*.

The transaction management unit 111*a* performs a transaction completion process (a commit process or a rollback process). The commit process confirms the success of a transaction and guarantees the data updated within the transaction. The rollback process undoes the changes made by the transaction and restores the data updated within the transaction to the state before the update. The transaction origin processing unit 111*b* assigns a transaction identifier (e.g., a number to identify the transaction, which may also be referred to as a "TR identification number") to identify the transaction to the transaction and starts the transaction. It should be noted that there may be more than one transaction origin processing unit 111*b*.

The transaction management unit 111*a* manages transactions by recording the TR identification number that is the transaction identifier in the log 112.

In FIG. 2, the transaction management unit 111*a* and the transaction origin processing unit 111*b* are included in one device, but each of the transaction management unit 111*a* and the transaction origin processing unit 111*b* may be included in a separate device, as in the third embodiment (refer to FIG. 12) and the fourth embodiment (refer to FIG. 18) described below.

The CPU 130 loads program 111 stored in the storage device 110 into the memory 120. The CPU 130 executes the program 111 loaded into the memory 120 to realize various functions of the transaction management unit 111*a* and the transaction origin processing unit 111*b*.

The log 112 contains log (information) about the transactions. The details of the log 112 are described below.

In the memory 120, the program 111 executed by the CPU 130 is loaded as described above, and data used by the CPU 130 to execute program 111 is temporarily stored.

The input/output interface 140 is an interface for connecting operating devices such as a keyboard and mouse, as well as displays and other devices. The network interface 150 is an interface for connecting the transaction management device 100 to the network NW1.

FIG. 3 illustrates an example of the log 112. The log 112 includes a transaction identifier 112*a*, a settlement result 112*b*, and a list of resource management identifiers 112*c* as columns (columns) that store information (values).

The log 112 stores information corresponding to each column regarding the settlement result of the transaction as rows of information (records) associated with each other. Specifically, the transaction identifier 112*a* contains a TR identification number, which is a transaction identifier to identify the transaction. The settlement result 112*b* contains a commit or a rollback that indicates the settlement result of the transaction. It should be noted that a commit or a rollback stored in the settlement result 112*b* may also be referred to as the "settlement result log" or the "transaction settlement result log" for convenience. If the corresponding settlement result is a commit, the list of resource management identifiers 112*c* contains the identifier of the resource management part 211 that has voted Yes to commit. If the corresponding settlement result is a rollback and the resource management unit 211 that participated in the transaction is known, the identifier (identification information) of the known resource management unit 211 may also be stored.

Figure 4:
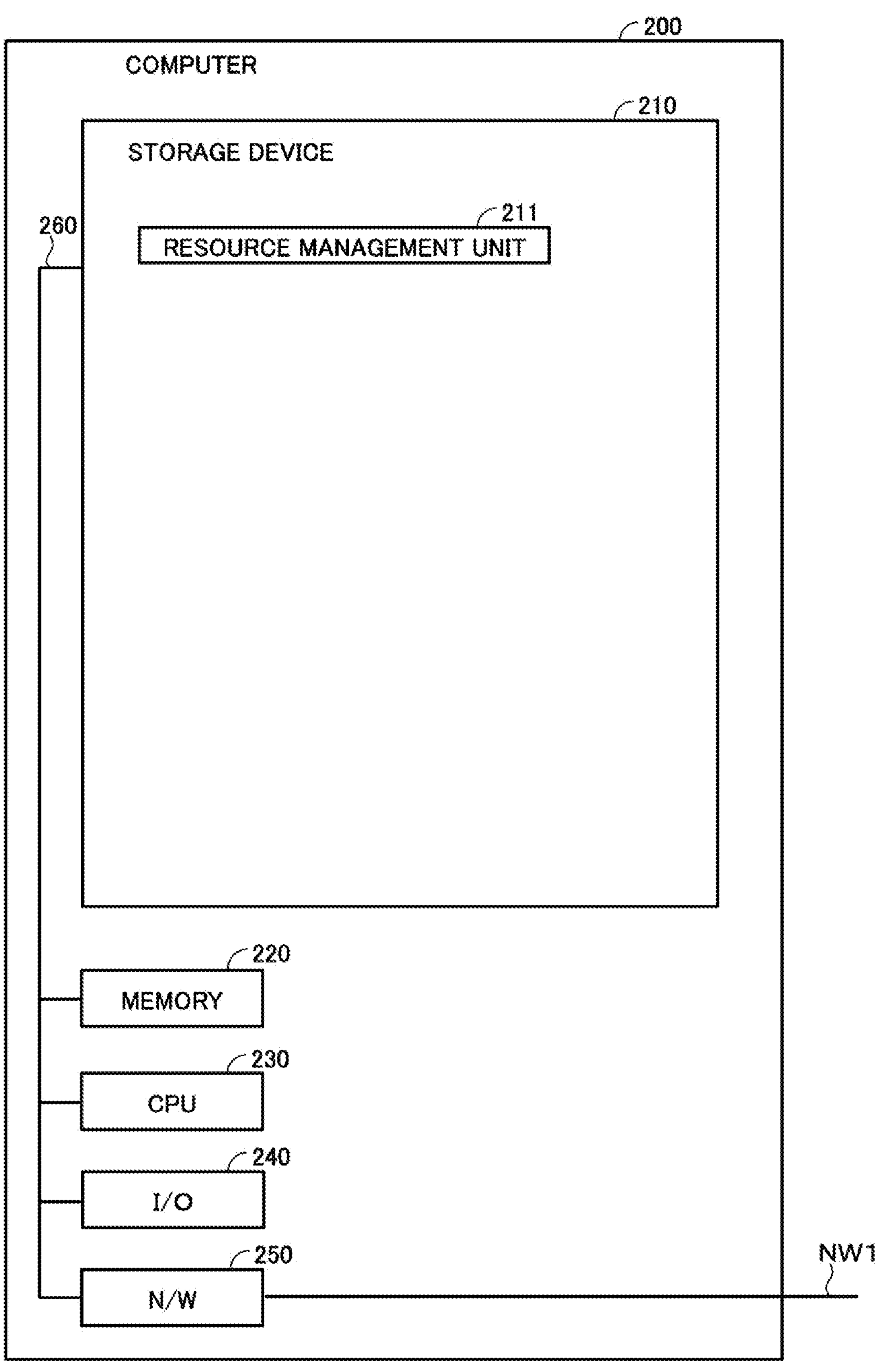
FIG. 4 is a schematic diagram showing an example configuration of a compute.

FIG. 4 is a schematic diagram of an example configuration of a computer 200. As shown in FIG. 4, the computer 200 includes a non-volatile storage device 210 that can read and write data, a memory 220 (e.g., RAM), a CPU 230, an input/output interface 240, and a network interface 250. These are communicatively connected to each other via bus 260.

The device including the CPU 230, the storage device 210, the memory 220, the input/output interface 240, the network interface 250, and the bus 260 is also referred to as an "information processing device" for convenience. The information processing device may be multiple information processing devices, a virtual information processing device built on cloud, or a virtual environment such as a container.

The storage device 210 holds (stores) the resource management unit 211. The resource management unit 211 is composed of a database, programs for managing the database (e.g., operating the database) (e.g., DBMS: Database Management System), programs for providing a message queue system, programs for providing a file system, etc. The resource management unit 211 executes data processing requested by the transaction against the database, executes message queues, searches data files, updates data files, and so on.

The CPU 230 loads the program stored in the storage device 210 into the memory 220. The CPU 230 implements the functions of the resource management unit 211 by executing the program loaded into memory 220.

In the memory 220, the program to be executed by the CPU 230 is loaded as described above, and data used by the CPU 230 to execute the program is temporarily stored.

The input/output interface 240 is an interface for connecting operation devices such as a keyboard and mouse, as well as displays and other devices. The network interface 250 is an interface for connecting the computer 200 to the network NW1.

Overview

Figure 5:
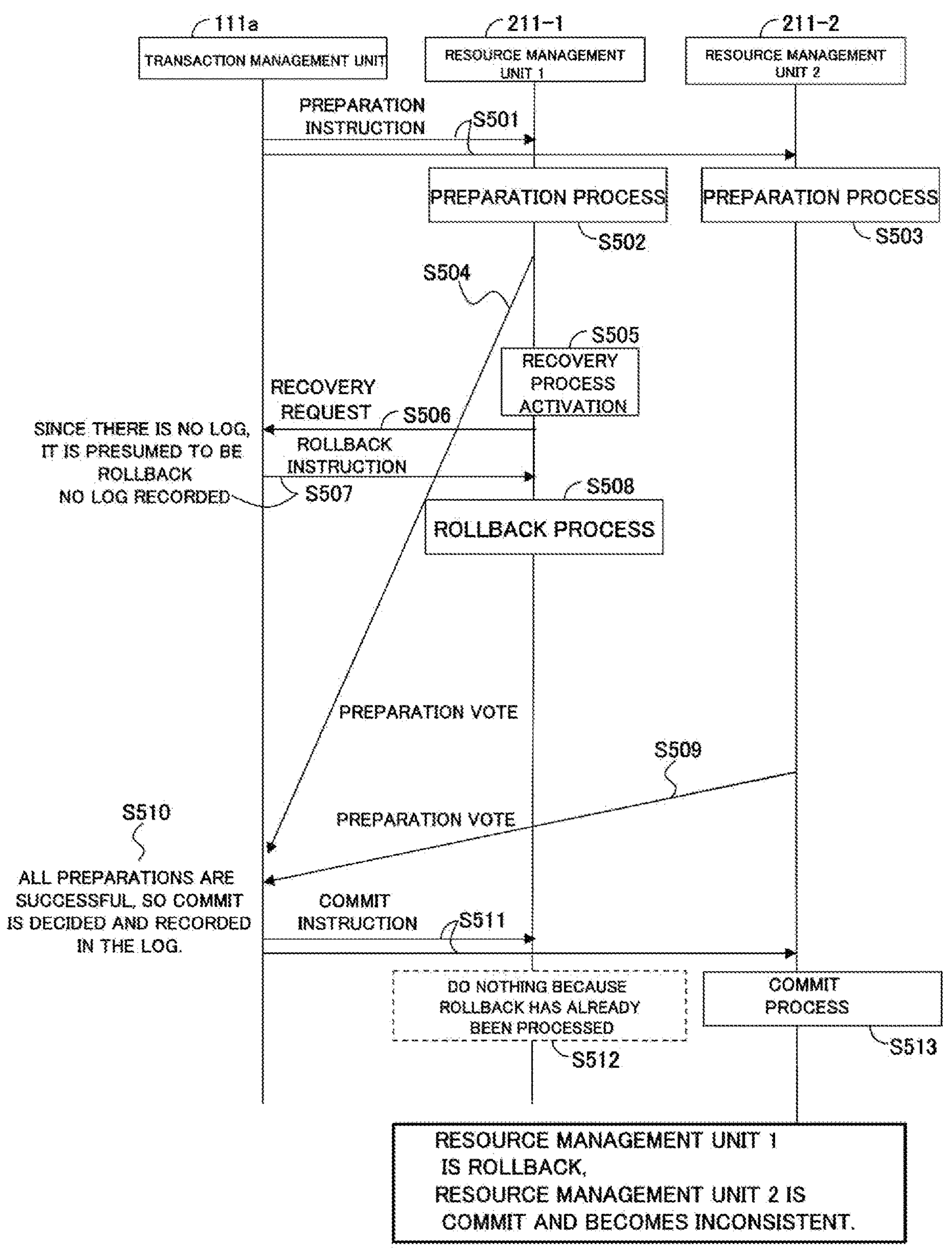
FIG. 5 is a sequence diagram to explain the processes executed by a transaction management unit, a resource management unit and a resource management unit in a reference example.

First, to facilitate understanding of the present invention, the issues of the present invention are described. FIG. 5 is a sequence diagram illustrating the processes performed by the transaction management unit 111*a*, the resource management unit (1) 211-1, and the resource management unit (2) 211-2 in a reference example.

As shown in FIG. 5, in two-phase committed transaction processing, if the system is in a specific environment, processing delays or communication delays can cause processing order reversal in any of the multiple resource management units 211 (in this example, the resource management unit (1) 211-1). The processing order reversal is that the rollback process (S508) by a recovery request (S506) occurs before the arrival of the transaction completion instruction (S511) executed based on the transaction settlement by a preparation vote. The preparation vote is either "Yes to commit" (if the transaction participant has ended properly) "NO to commit" (if a problem has been detected with the transaction participant).

Here, the specific environment is an environment where a situation may arise in which the processing order reversal does not occur in the resource management units 211 other than the resource management unit 211 in which the processing order reversal first occurred, the processing order reversal being that the rollback process by the recovery request occurs before the arrival of the transaction completion instruction executed based on the transaction settlement by the preparation vote. The specific environment is, for example, an environment where (1) a recovery process activation timeout time TR1+a minimum value of a recovery request communication time<a maximum value of the preparation vote communication time TP, and (2) a maximum value of the preparation vote communication time TP<a processing delay time TR2 for activating the recovery process are satisfied.

The "recovery process activation timeout time TR1" is the determination standard time for determining the activation of the recovery process. If the resource management unit 211 does not receive a commit instruction from the transaction management unit 111*a* by a time at which the recovery process activation timeout time TR1 elapses after all of the participants send the preparation votes, the resource management unit 211 activates/initiates the recovery process after a time at which the recovery process activation timeout time TR1 elapses. The timing at which a recovery process is triggered after the recovery process activation timeout time TR1 elapses depends on the processing performance of each resource management unit 211 and other factors.

The "minimum value of the recovery request communication time" is the minimum communication time from when the resource management unit 211 sends the recovery request (e.g., S506) until the recovery request reaches the transaction management unit 111*a*. The "recovery request communication time" is not a constant time by its nature, but varies, so it is a time that has a range from a minimum value to a maximum value.

The "maximum value of the preparation vote communication time TP" is the maximum value of the communication time from when the resource management unit 211 sends the preparation vote to the transaction management unit 111*a* (for example, S504) until it reaches the transaction management unit 111*a*. It should be noted that the "preparation vote communication time TP" is not a constant time by its nature, but varies, so the time has a range from a minimum value to a maximum value.

The "processing delay time TR2 for activating the recovery process" refers to the delay time from the time when the first recovery processing is triggered to the time when the next recovery processing is triggered among the multiple resource management units 211. That is, when the first recovery process is triggered in one of the 211 resource management units, the "processing delay time TR2 for activating the recovery process" is the time (delay time) between the time when the recovery process is triggered and the time when the recovery process is expected to be triggered in the other resource management unit 211. In this example, the recovery process is first triggered (S505) in the resource management unit (1) 211-1. Therefore, the "processing delay time TR2 for activating the recovery process" is the time from the time when the resource management unit (1) 211-1 activates the recovery process (S505) to the time when the resource management unit (2) 211-2 is expected to activate the recovery process (not shown).

If (1) is satisfied, for example, the arrival time of the first recovery request (S506) from any one of the resource management units 211 (in this example, the resource management unit (1) 211-1) that first triggered the recovery process may occur earlier than the arrival time (S510) of the preparation vote of any one of the resource management units 211 (in this example, the resource management unit (1) 211-1). Furthermore, in the case where (1) is satisfied, it can occur that after presuming the transaction to be a rollback (S507), the transaction management unit 111*a* then settles/resolves the transaction to a commit (S510) by the transaction settlement by the preparation vote (for example, such as when the communication time for a rollback instruction (S507) and the communication time for a commit instruction (S511) are minimal). Furthermore, when (2) is satisfied, the arrival time of the commit instruction (S511) to the other resource management unit 211 (in this example, the resource management unit (2) 211-2) is earlier than the expected time of activation of the recovery process of the other resource management unit (in this example, the resource management unit (2) 211-2), or the arrival time of the commit instruction (S511) to the other resource management unit 211 (in this example, the resource management unit (2) 211-2) is earlier than the expected time of the activation of the recovery process of the other resource management unit (in this example, the resource management unit (2) 211-2). That is, a state may occur where the recovery process is also triggered in resource management unit (2) 211-2, but the rollback instruction is delayed. That is, when (2) is satisfied, no processing order reversal occurs in the other resource management unit (2) 211-2.

In the specific environment like this, if the processing order reversal occurs in only the resource management unit (1) 211-1 that started the recovery process, transaction inconsistency may occur due to an inconsistency between the rollback determination for the recovery request (S506) from the resource management unit (1) 211-1 and the preparation vote (S510) indicating YES to commit.

Specifically, when the system is in the specific environment, the transaction management unit 111*a*, the resource management unit (1) 211-1, and the resource management unit (2) 211-2 perform the processes S501 through S513 described below in order.

S501: The transaction management unit 111*a* gives preparation process instructions to the resource management unit (1) 211-1 and the resource management unit (2) 211-2 that participate in the transaction in order to cause them to execute a transaction preparation process (a preparation process).

S502: The resource management unit (1) 211-1 executes the preparation process (i.e., the process of putting the transaction into a preparation state that can be committed or rolled back) in response to the preparation instruction from the transaction management unit 111*a*.

S503: The resource management unit (2) 211-2 executes the preparation process in response to the preparation instruction from the transaction management unit 111*a*.

S504: The resource management unit (1) 211-1 sends the preparation vote to the transaction management unit 111*a*, the preparation vote indicating either the success of the preparation process (a preparation success (YES to commit)) or the failure of the preparation process (a preparation failure (NO to commit)).

S505: The resource management unit (1) 211-1 invokes/initiates the recovery process. It should be noted that the recovery process is a process to restore system integrity in the event of a mid-transaction interruption or failure. For example, the recovery process is triggered/initiated when there is no commit instruction from the transaction management unit 111*a* by the time at which the predetermined time (recovery process activation timeout time TR1) elapses after the preparation vote is sent by the resource management unit (1) 211-1. In this example, the recovery process is triggered/initiated because there is a delay in the arrival of the commit instruction (S511) from the transaction management unit 111*a* to the resource management unit (1) 211-1 due to the delay in the transmission of the preparation vote to the transaction management unit 111*a*.

S506: The resource management unit (1) 211-1 sends the recovery request to the transaction management unit 111*a*.

S507: The transaction management unit 111*a* receives the recovery request from the resource management unit (1) 211-1. Since no log (settlement result log) exists in the log 112 for this transaction, the transaction management unit 111*a* presumes that the preparation process result is a rollback and sends a rollback instruction to the resource management unit (1) 211-1. It should be noted that the transaction management unit 111*a* does not record the log (settlement result log) in the log 112.

S508: When the resource management unit (1) 211-1 receives the rollback instruction from the transaction management unit 111*a*, it performs the rollback process.

S509: Due to processing delays, the resource management unit (2) 211-2 sends the preparation vote to the transaction management unit 111*a* after the preparation process is complete, but later than when the resource management unit (1) 211-1 sends the preparation vote to the transaction management unit 111*a*.

S510: The transaction management unit 111*a* receives the preparation vote from the resource management unit (1) 211-1 and the resource management unit (2) 211-2. Since all received the preparation votes are preparation process successes (YES to commit), the transaction management unit 111*a* settles on a commit and records a commit in the settlement result 112*b* of the log 112.

S511: The transaction management unit 111*a* sends a commit instruction to the resource management unit (1) 211-1 and a commit instruction to the resource management unit (2) 211-2.

S512: When the resource management unit (1) 211-1 receives the commit instruction from the transaction management unit 111*a*, it does nothing because the rollback process has already been completed.

S513: When the resource management unit (2) 211-2 receives the commit instruction from the transaction management unit 111*a*, it performs the commit process.

When the transaction management unit 111*a*, the resource management unit (1) 211-1, and the resource management unit (2) 211-2 operate as described above to process the transaction, the resource management unit (1) 211-1 becomes a rollback and the resource management unit (2) 211-2 becomes a commit, resulting in transaction inconsistencies.

Figure 6:
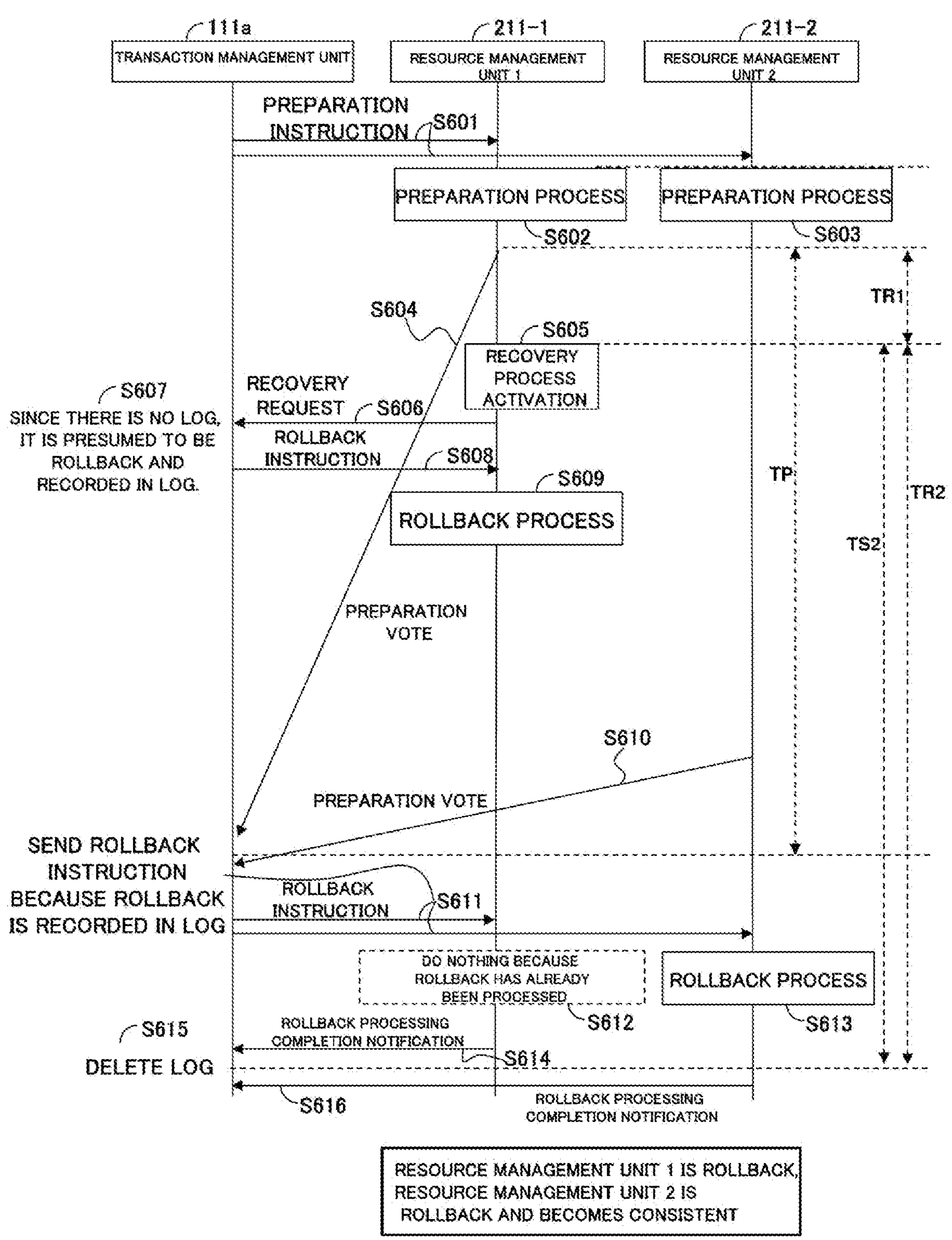
FIG. 6 is a sequence diagram illustrating the processes performed by the transaction management unit, a resource management unit (1) and a resource management unit (2) of the first embodiment of the present invention.

Therefore, in order to avoid inconsistent transactions, the transaction management device 100 according to the first embodiment records a rollback transaction settlement result log in the log 112 even when the transaction settlement result is a rollback (refer to S607 in FIG. 6 below). This avoids transaction inconsistency.

On the other hand, if the rollback transaction settlement result log is recorded in the log 112, it will be necessary to delete the rollback transaction settlement result log, which was not necessary in the conventional technology, in order to avoid an increase in storage space for storing the log 112.

In order to delete the transaction settlement result log, it may be necessary to use the transaction settlement result log until the transaction processing is complete, so it is necessary to confirm that the transaction processing is complete (i.e., "in all databases (the resource management unit 211), the commit process or the rollback process is completed"). For this purpose, the idea is that the transaction management unit 111*a* needs to know which resource management units (1) 211-1 and (2) 211-2 are participating in the transaction.

Based on this concept, when the transaction is completed with a commit, the transaction management unit 111*a* is aware of all resource management units (1) 211-1 and resource management units (2) 211-2 participating in the transaction. Therefore, the transaction management unit 111*a* deletes the transaction settlement result log of a commit when it receives notification of the completion of the commit process from all resource management units 211.

On the other hand, in the case of a rollback, the preparation vote itself may not have reached the transaction management unit 111*a* due to timeout or other reasons, so the transaction management unit 111*a* may not necessarily know all resource management units 211 participating in the transaction.

This makes it difficult to determine when to delete the transaction settlement result log without being able to confirm that the rollback has been completed in all resource management units 211 participating in the transaction. Therefore, if the timing for deleting the transaction settlement result log of the rollback is not determined, the storage space for storing the log 112 will increase.

Therefore, the transaction management device 100 according to the first embodiment performs the deletion of the transaction settlement result log of the rollback at the timing described below. That is, the transaction management unit 111*a* of the transaction management device 100 deletes the rollback transaction settlement result log from the log 112 when it receives the completion of processing the rollback from any one of the multiple resource management units 211. In the specific environment, there is no need for the transaction management unit 111*a* to use the transaction settlement result log after the point in time when it receives the completion of processing the rollback from any one of the multiple resource management units 211 participating in the transaction, so the transaction settlement result log is deleted at this timing.

Here, the specific environment is an environment where a situation may arise in which the processing order reversal does not occur for more than a certain period of time after the settlement of the transaction (the time when the settlement result of the rollback is recorded in the log 900)) due to the recovery request of the activated recovery process in resource management units 211 other than the resource management unit 211 in which the processing order reversal first occurred, the processing order reversal being that the rollback process by the recovery request occurs before the arrival of the transaction completion instruction executed based on the transaction settlement by the preparation vote.

The specific environment is, for example, an environment where (1) the recovery process activation timeout time TR1+the minimum value of the recovery request communication time<the maximum value of the preparation vote communication time TP, (2) the maximum value of the preparation vote communication time TP<the processing delay time TR2 for activating the recovery process, and (3) the maximum value of the preparation vote communication time TP<the recovery processing time TS2 are satisfied. It should be noted that the recovery processing time TS2 is the recovery process activation timeout time TR1+the minimum value of the recovery request communication time+the minimum commit or rollback instruction communication time+ the rollback processing time+the minimum value of the commit or rollback processing completion notification communication time and is an arbitrary time determined depending on processing delay time, etc.

This allows the transaction management device 100 to guarantee the integrity of the distributed transaction while preventing an increase in the storage space of the log 112. In addition, since the transaction management unit 111*a* only determines the point in time when it receives the completion of processing the rollback from one resource management unit 211 participating in the transaction in order to delete the rollback transaction settlement result log, the transaction management device 100 can delete the rollback transaction settlement result log in a simple manner.

Operation

The operation of the transaction management device 100 according to the first embodiment of the present invention is described below. FIG. 6 is a sequence diagram illustrating the processes performed by the transaction management unit 111*a*, the resource management unit (1) 211-1, and the resource management unit (2) 211-2 according to the first embodiment of the present invention.

The transaction management unit 111*a*, the resource management unit (1) 211-1 and the resource management unit (2) 211-2 perform the processes S601 through S615 described below in order.

S601: The transaction management unit 111*a* gives preparation instructions to the resource management unit (1) 211-1 and the resource management unit (2) 211-2 that participate in the transaction.

S602: The resource management unit (1) 211-1 executes the preparation process in response to the preparation instruction from the transaction management unit 111*a*.

S603: The resource management unit (2) 211-2 executes the preparation process in response to the preparation instruction from the transaction management unit 111*a*.

S604: The resource management unit (1) 211-1 sends the preparation vote to the transaction management unit 111*a*.

S605: The resource management unit (1) 211-1 activates/initiates the recovery process when the recovery process activation timeout time TR1 elapses from the time at which it transmitted the preparation vote.

S606: The resource management unit (1) 211-1 sends the recovery request to the transaction management unit 111*a*.

S607: The transaction management unit 111*a* checks whether the log (settlement result log) about the transaction exists in the log 112. When the transaction log (settlement result log) does not exist in the log 112, the transaction management unit 111*a* presumes a rollback and records a rollback in the settlement result 112*b* in the log 112.

S608: The transaction management unit 111*a* sends a rollback instruction to the resource management unit (1) 211-1.

S609: When the resource management unit (1) 211-1 receives the rollback instruction from the transaction management unit 111*a*, it performs the rollback process.

S610: The resource management unit (2) 211-2 sends the preparation vote to the transaction management unit 111*a* at a timing later than when the resource management unit (1) 211-1 sends the preparation vote after the preparation process is completed.

S611: The transaction management unit 111*a* receives the preparation vote from the resource management unit (1) 211-1 and the resource management unit (2) 211-2. The transaction management unit 111*a* checks the log (settlement result log) regarding the transaction, and if the log (settlement result log) exists in the log 112, it directs processing of the transaction based on the settlement result log in the log 112, regardless of the result of the received the preparation vote. Here, the transaction management unit 111*a* sends rollback instructions to the resource management unit (1) 211-1 and the resource management unit (2) 211-2 because a rollback is recorded in the settlement result 112*b* of the log 112.

S612: When the resource management unit (1) 211-1 receives the rollback instruction from the transaction management unit 111*a*, it does nothing because it has already processed the rollback.

S613: When the resource management unit (2) 211-2 receives the rollback instruction from the transaction management unit 111*a*, it performs the rollback process.

S614: The resource management unit (1) 211-1 sends a rollback process completion notification to the transaction management unit 111*a*.

S615: When the transaction management unit 111*a* receives the rollback process completion notification from the resource management unit (1) 211-1, it deletes the log (row (record)) containing the settlement result log (a rollback) for the transaction from the log 112.

S616: The resource management unit (2) 211-2 sends a rollback process completion notification to the transaction management unit 111*a*.

Figure 7:
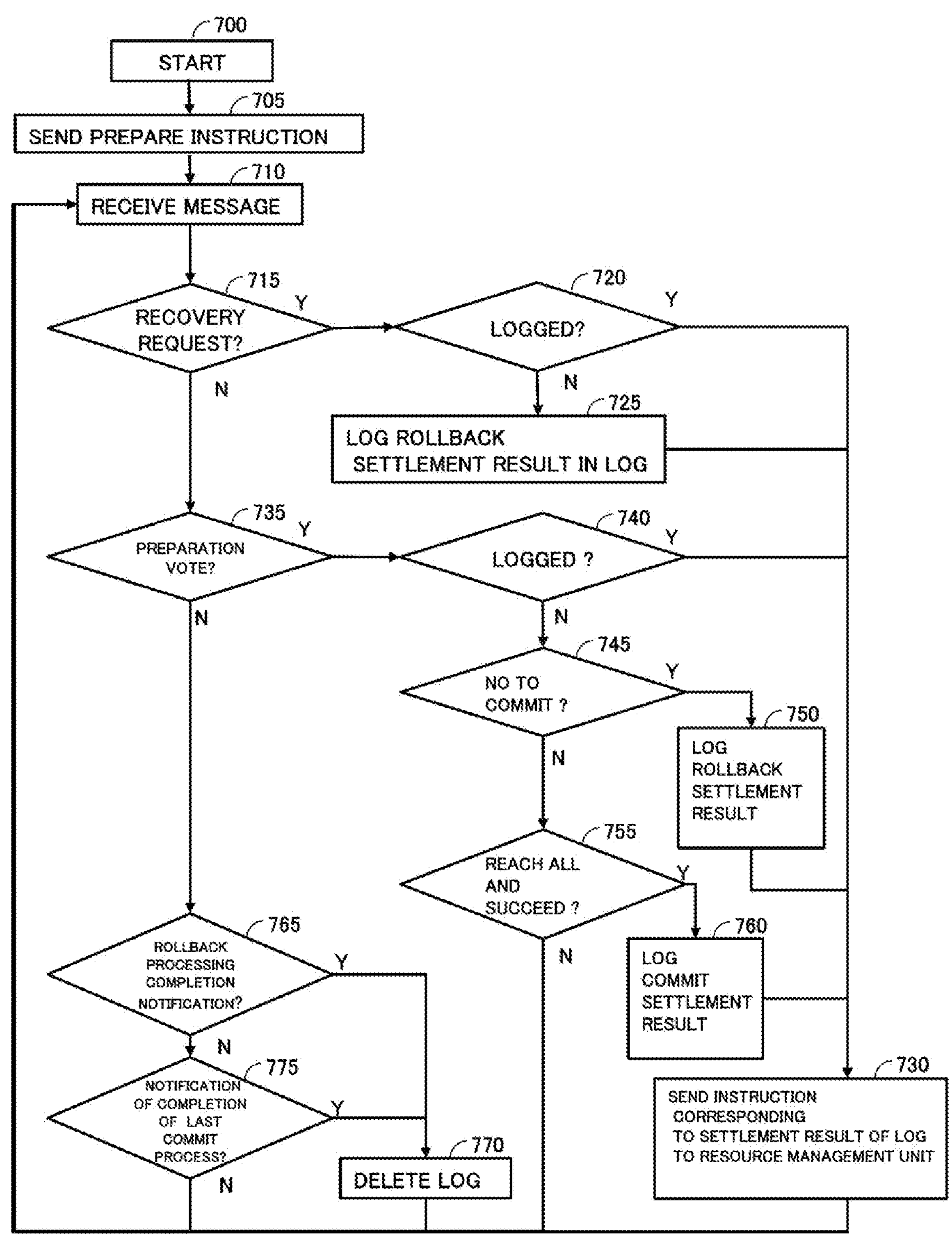
FIG. 7 is a flowchart showing a processing flow executed by the transaction management unit.

FIG. 7 is a flowchart showing the processing flow executed by the transaction management unit 111*a*. The transaction management unit 111*a* starts processing from step 700, executes steps 705 and 710 described below in sequence, and then proceeds to step 715.

Step 705: The transaction management unit 111*a* sends the preparation instruction to the resource management unit 211 participating in the transaction.

Step 710: The transaction management unit 111*a* receives a message from the resource management unit 211.

At step 715, the transaction management unit 111*a* determines whether the message is the recovery request. When the message is the recovery request, the transaction management unit 111*a* makes a "YES" determination at step 715 and proceeds to step 720 to determine whether log (settlement result log) for the transaction subject to the recovery request has been recorded in the log 112.

When the log (settlement result log) for the transaction subject to the recovery request has not already been recorded in the log 112, the transaction management unit 111*a* makes a "NO" determination at step 720 and proceeds to step 725. At step 725, the transaction management unit 111*a* records the rollback settlement in the settlement result 112*b* of the log 112, presuming that the settlement of the transaction is a rollback because the log (settlement result log) for the transaction subject to the recovery request has not already been recorded in the log 112.

The transaction management unit 111*a* then proceeds to step 730 to send instructions corresponding to the settlement result in the log 112 to the resource management unit 211 and returns to step 710.

On the other hand, for example, when the recovery process is triggered/initiated in the resource management unit (2) 211-2 and the recovery request is made by the resource management unit (2), after the recovery process is triggered/initiated in the resource management unit (1) 211-1 and the rollback settlement result is recorded in the log 112 (step 725), the log (settlement result log) has already been recorded in the log 112. When the log (settlement result log) for the transaction subject to the recovery request has already been recorded in the log 112 at step 720, the transaction management unit 111*a* makes a "YES" determination at step 720 and proceeds directly to step 730 to perform the processing in step 730 as described above. Thereafter, the transaction management unit 111*a* returns to step 710.

When the message is not the recovery request at step 715, the transaction management unit 111*a* makes a "NO" determination at step 715 and proceeds to step 735 to determine whether the message is the preparation vote.

When the message is the preparation vote, the transaction management unit 111*a* makes a "YES" determination at step 735 and proceeds to step 740 to determine whether the log (settlement result log) about the transaction has already been recorded in the log 112.

When the log (settlement result log) about the transaction has already been recorded in the log 112, the transaction management unit 111*a* makes a "YES" determination at step 740 and proceeds to step 730, executes the previously described step 730, and then returns to step 710.

In contrast, when the log (settlement result log) about the transaction has not already been recorded in the log 112, the transaction management unit 111*a* makes a "NO" determination at step 740 and proceeds to step 745 to determine whether the preparation vote is "preparation failure (NO to commit)".

When the preparation vote is "preparation failure (NO to commit)", the transaction management unit 111*a* makes a "YES" determination at step 745 and proceeds to step 750, records the rollback settlement result in the settlement result 112*b* in the log 112, then proceeds to step 730, executes the previously described step 730, executes the process of step 730 as already described, and thereafter, return to step 710.

When the preparation vote is "preparation success (YES to commit)", the transaction management unit 111*a* makes a "NO" determination at step 745 and proceeds to step 755 to determine whether the preparation vote have arrived from all of the resource management units 211 participating in the transaction and all of the preparation votes are successful (preparation success (YES to commit)).

When the preparation votes arrive from all of the resource management units 211 participating in the transaction and all of the preparation votes are successful, the transaction management unit 111*a* makes a "YES" determination at step 755 and proceeds to step 760. When the transaction management unit 111*a* proceeds to step 760, since all the votes of the resource management unit 211 participating in the transaction are "preparation success (YES to commit)", the transaction is settled as a commit, and the commit settlement result is recorded in the settlement result 112*b* in the log 112. The transaction management unit 111*a* then proceeds to step 730, executes the previously described step 730, and returns to step 710.

On the other hand, when the preparation votes have not been received from all of the resource management units 211 participating in the transaction, the transaction management unit 111*a* makes a "NO" determination at step 755 and returns to step 710.

When the message is not the preparation vote at step 735 above, the transaction management unit 111*a* makes a "NO" determination at step 735 and proceeds to step 765 to determine whether the message is the rollback process completion notification.

When the message is the rollback process completion notification, the transaction management unit 111*a* makes a "YES" determination at step 765 and proceeds to step 770 to delete the log for that transaction (the row (record) containing the rollback settlement result log) from the log 112 and returns to step 710. When the message is not the rollback process completion notification, the transaction management unit 111*a* makes a "NO" determination at step 765 and proceeds to step 775 to check whether the message is the last commit process completion notification from the resource management unit 211 participating in the transaction in the log 112, based on the list of resource management identifiers 112*c* (list of resource management units 211 participating in the transaction).

When the message is a notification of the completion of the last commit process, the transaction management unit 111*a* makes a "YES" determination at step 775 and proceeds to step 770 to delete the log for that transaction (the row (record) containing the commit settlement result log) from the log 112 and then returns to step 710. When the message is not the last commit process completion notification, the transaction management unit 111*a* makes a "NO" determination at step 775 and returns to step 710.

By executing the above process flow, the transaction management unit 111*a*, when there is a transaction recovery request and the settlement result log for the transaction does not exist in the log 112, presumes a rollback and records (stores) a rollback in the settlement result 112*b* of the log 112 corresponding to the transaction identifier 112*a* of that transaction.

When at least one of the preparation votes is "preparation failure (NO to commit)", the transaction management unit 111*a* assumes that the transaction settlement is a rollback and records (stores) a rollback in the settlement result 112*b* corresponding to the transaction identifier 112*a* for that transaction in the log 112.

When the transaction management unit 111*a* receives the rollback process completion notification from any one of the resource management units participating in the transaction, it deletes the transaction's log (the row (record) including the transaction settlement result log (a rollback) corresponding to the transaction identifier)) from the log 112.

When all of the preparation votes are successful (preparation success (YES to commit)), the transaction management unit 111*a* assumes the settlement of the transaction to be a commit, and records (stores) the commit in the settlement result 112*b* corresponding to the transaction identifier 112*a* of the transaction in the log 112.

When the transaction management unit 111*a* has received a notification of the completion of the commit process from all of the resource management units 211 participating in the transaction, it deletes the transaction's log (the row (record) corresponding to the transaction identifier) from the log 112.

By recording and deleting the transaction settlement result log in this manner, the transaction management unit 111*a* can guarantee the integrity of distributed transaction while preventing an increase in storage space for recording the log 112.

Figure 8:
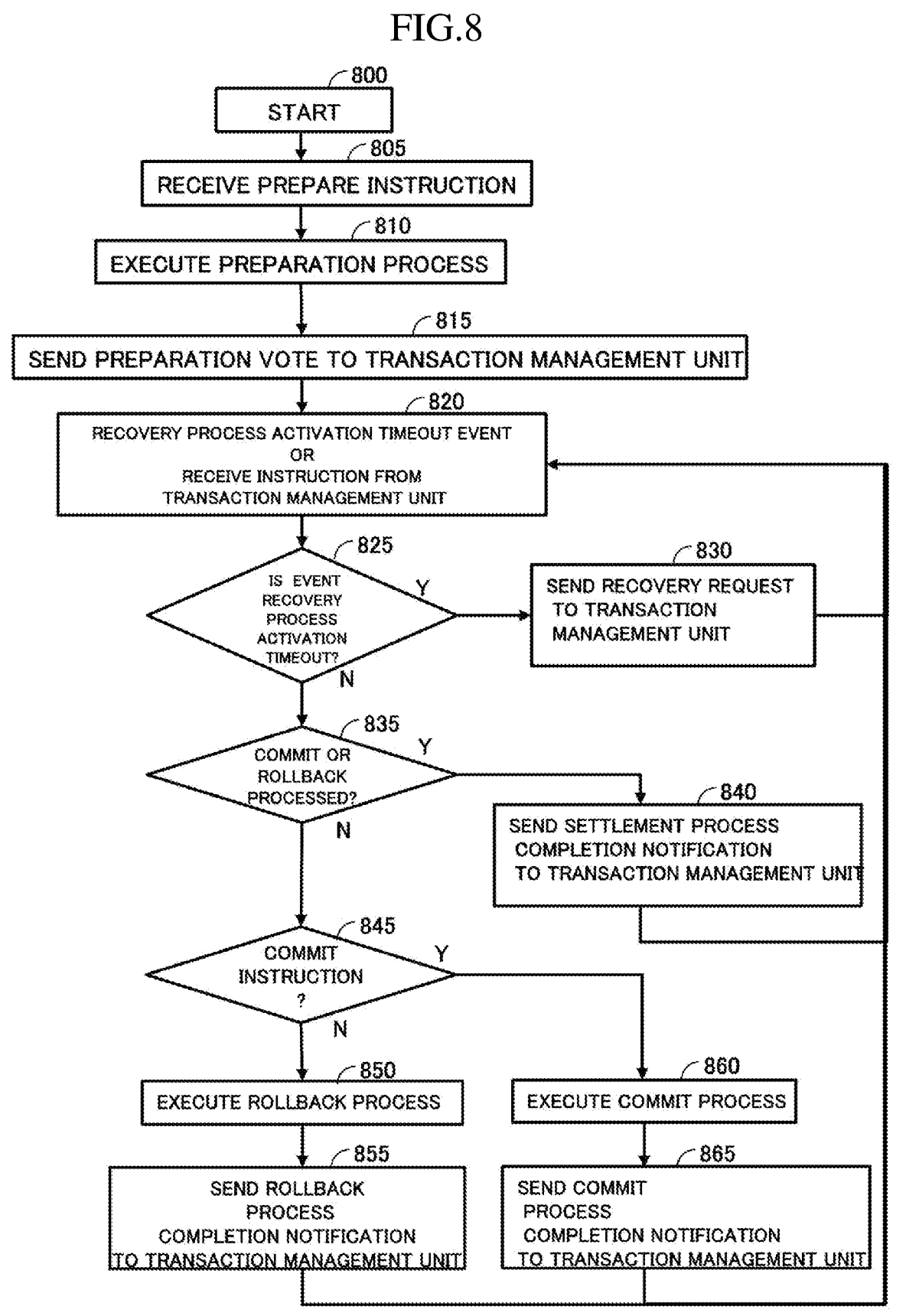

FIG. 8 is a flowchart showing the processing flow executed by the resource management unit 211. The resource management unit 211 starts processing from step 800, executes steps 805 through 820 described below in sequence, and then proceeds to step 825.

Step 805: The resource management unit 211 receives the preparation instruction from the transaction management unit 111*a*.

Step 810: The resource management unit 211 performs/executes the preparation process.

Step 815: The resource management unit 211 sends the preparation vote to the transaction management unit 111*a*.

Step 820: The resource management unit 211 receives a recovery process activation timeout event or an instruction from the transaction management unit 111*a*.

At step 825, the resource management unit 211 determines whether the event is the recovery process activation timeout event. It should be noted that the recovery process activation timeout event is a state in which the recovery process is activated after the recovery process activation timeout time TR1 has elapsed from the time at which the preparation vote was transmitted.

When the event is the recovery process activation timeout event, the resource management unit 211 makes a "YES" determination at step 825 and proceeds to step 830, sends the recovery request to the transaction management unit 111*a*, and then returns to step 820.

When the event is not the recovery process activation timeout event, the resource management unit 211 makes a "NO" determination at step 825 and proceeds to step 835 to determine whether the commit process or the rollback process has been completed.

When the commit process or the rollback process has been completed, the resource management unit 211 makes a "YES" determination at step 835 and proceeds to step 840, sends a settlement process completion notification to the transaction management unit 111*a*, and then returns to step 820.

When neither the commit process nor the rollback process has been completed (i.e., neither commit nor rollback), the resource management unit 211 makes a "NO" determination at step 835 and proceeds to step 845.

At step 845, the resource management unit 211 determines whether the instruction from the transaction management unit 111*a* is a commit instruction.

When the instruction from the transaction management unit 111*a* is not the commit instruction, the resource management unit 211 makes a "NO" determination at step 845, executes steps 850 and 855 described below in sequence, and then returns to step 820.

Step 850: The resource management unit 211 performs/executes the rollback process.

Step 855: The resource management unit 211 sends the rollback process completion notification to the transaction management unit 111*a*.

When the instruction from the transaction management unit 111*a* is the commit instruction, the resource management unit 211 makes a "YES" determination at step 845, executes steps 860 and 865 described below in sequence, and then returns to step 820.

Step 860: The resource management unit 211 performs/executes the commit process.

Step 865: The resource management unit 211 sends a commit process completion notification to the transaction management unit 111*a*.

Effect

As explained above, the transaction management device 100 according to the first embodiment of the present invention can prevent an increase in the storage space of the log 112 (transaction log) while guaranteeing the integrity of distributed transactions. Furthermore, the transaction management device 100 can delete the rollback transaction settlement result log in a simple manner.

Second Embodiment

The transaction management device 100 according to the second embodiment of the present invention will be described. The transaction management device 100 according to the second embodiment maintains (stores) the log 900 shown in FIG. 9 instead of the log 112 shown in FIG. 3. As shown in FIG. 9, the log 900 includes a transaction identifier 112*a*, a settlement result 112*b*, a list of resource management identifiers 112*c*, and a recording time 112*d* as columns (columns) that store information (values). The transaction identifier 112*a*, the settlement result 112*b*, and the list of resource management identifiers 112*c* are the same as in the log 112 shown in FIG. 3. The recording time 112*d* contains the time when the log (the settlement result log) was recorded.

Operation

Figure 10:
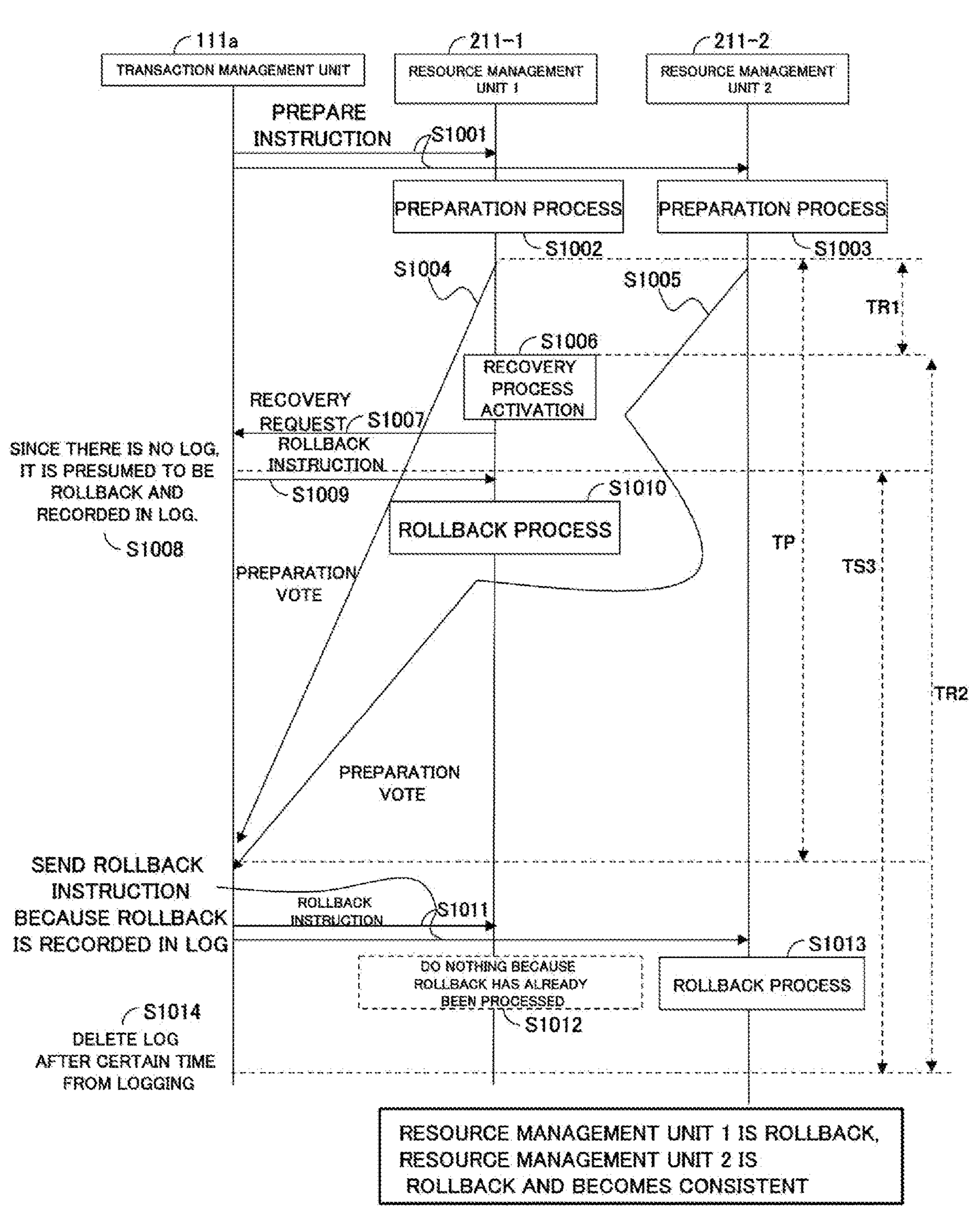
FIG. 10 is a sequence diagram illustrating the processes performed by the transaction management unit, the resource management unit (1) and the resource management unit (2) of the second embodiment of the present invention.

The operation of the transaction management device 100 according to the second embodiment of the present invention is described below. FIG. 10 is a sequence diagram illustrating the processes performed by the transaction management unit 111*a*, the resource management unit (1) 211-1, and the resource management unit (2) 211-2 of the second embodiment of the present invention.

In a specific environment, within the certain period of time after the rollback transaction settlement (S1008) due to the recovery request (S1007), the processing order reversal may occur in the resource management unit (2) 211-2, but after the certain period of time has elapsed from the rollback transaction settlement (a time point (S1008) when the rollback settlement result is recorded in the log 900), the processing order reversal does not occur after the certain period of time has elapsed from the rollback transaction settlement (the time at which the rollback settlement result is recorded in the log 900).

Here, the specific environment is an environment where a situation may arise in which the processing order reversal does not occur for more than the certain period of time after the settlement of the transaction (the time when the settlement result of the rollback is recorded in the log 900)) due to the recovery request of the activated recovery process in the resource management unit 211 other than the resource management unit 211 in which the processing order reversal first occurred, the processing order reversal being that the rollback process by the recovery request occurs before the arrival of the transaction completion instruction executed based on the transaction settlement by the preparation vote.

The specific environment is, for example, an environment where (1) the recovery process activation timeout time TR1+the minimum value of the recovery request communication time<the maximum value of the preparation vote communication time TP, and (2) the maximum value of the preparation vote communication time TP<the processing delay time TR2 for activating the recovery process, and (3) the maximum value of the preparation vote communication time TP<the recovery process activation timeout time TR1+ the minimum recovery request communication time+the log retention time TS3 are satisfied. The log retention time TS3 is a time equivalent to the above fixed time, and is an arbitrary time determined according to the processing delay time and other factors. Therefore, in such a specific environment, the transaction management unit 111*a*, the resource management unit (1) 211-1, and the resource management unit (2) 211-2 of the transaction management device 100 according to the second embodiment perform the processes of S1001 to S1013 described below in order.

S1001: The transaction management unit 111*a* gives preparation instructions to the resource management unit (1) 211-1 and the resource management unit (2) 211-2 that participate in the transaction.

S1002: The resource management unit (1) 211-1 executes the preparation process in response to the preparation instruction from the transaction management unit 111*a*.

S1003: The resource management unit (2) 211-2 executes the preparation process in response to the preparation instruction from the transaction management unit 111*a*.

S1004: The resource management unit (1) 211-1 sends the preparation vote to the transaction management unit 111*a*.

S1005: The resource management unit (2) 211-2 sends the preparation vote to the transaction management unit 111*a*.

S1006: The resource management unit (1) 211-1 activates/initiates the recovery process because the recovery process activation timeout time TR1 has elapsed since the time when the preparation vote was sent. The resource management unit (2) 211-2 also times out because the recovery process activation timeout time TR1 has elapsed since the time when the preparation vote was sent. However, the recovery process is not activated at the same time in the resource management unit (1) 211-1 and the resource management unit (2) 211-2 because the timing of activation of the recovery process in resource management unit (2) 211-2 is out of sync with the timing of activation of the recovery process in the resource management unit (1) 211-1. Such a gap in activation of the recovery process is caused by a delay in activation of the recovery process after a timeout in the resource management unit (2) 211-2. Until the log retention time TS3 has elapsed since the rollback transaction due to the recovery request was completed, the resource management unit (2) 211-2 may also trigger the recovery process, so it is necessary to retain the rollback settlement result log within this log retention time TS3.

S1007: The resource management unit (1) 211-1 sends the recovery request to the transaction management unit 111*a*.

S1008: The transaction management unit 111*a* checks whether the settlement result log regarding the transaction exists in the log 900. When no log (settlement result log) exists for the transaction in the log 900, the transaction management unit 111*a* presumes a rollback and records a rollback in settlement result 112*b* in the log 900.

S1009: The transaction management unit 111*a* sends a rollback instruction to the resource management unit (1) 211-1.

S1010: When the resource management unit (1) 211-1 receives the rollback instruction from the transaction management unit 111*a*, it performs the rollback process.

S1011: The transaction management unit 111*a* receives the preparation votes from the resource management unit (1) 211-1 and the resource management unit (2) 211-2. The transaction management unit 111*a* checks the log (settlement result log) regarding the transaction, and if the log (settlement result log) exists in the log 900, it directs processing of the transaction based on the settlement result log in log 900, regardless of the result of the received preparation vote. Here, the transaction management unit 111*a* sends rollback instructions to the resource management unit (1) 211-1 and the resource management unit (2) 211-2 because a rollback is recorded in the settlement result 112*b* of the log 900.

S1012: When the resource management unit (1) 211-1 receives the rollback instruction from the transaction management unit 111*a*, it does nothing because it has already processed the rollback (the rollback process has already been completed).

S1013: When the resource management unit (2) 211-2 receives the rollback instruction from the transaction management unit 111*a*, it performs the rollback process.

S1014: Since the certain time (log retention time TS3) has elapsed from the time when the rollback settlement result log was recorded (time stored in record time 112*d*), the transaction management unit 111*a* deletes the log (row (record)) containing the settlement result log (rollback) for the transaction from the log 900.

In the specific environment, in a situation in which the processing order reversal does not in the resource management unit (2) 211-2 due to exceeding the certain time (log retention time TS3) from the time when the rollback settlement result log is recorded in the log 900 (S1008), even if the rollback settlement result log is retained in the log 900, there is no need to use the rollback settlement result log (i.e., the opportunity to use it does not arise).

On the other hand, within the certain time (log retention time TS3) from the time when the rollback settlement result log is recorded in the log 900 (S1008), processing order reversal may occur in the resource management unit (2) 211-2. Therefore, during that period, the transaction management unit 111*a* needs to retain the rollback settlement result log. Therefore, the transaction management unit 111*a* of the transaction management device 100 according to the second embodiment retains the rollback settlement result log until the certain time (log retention time TS3) elapses from the time when the rollback settlement result log is recorded in the log 900 (S1008). The transaction management unit 111*a* deletes the log (line (record)) containing the rollback settlement result log from the log 900 at a time at which the certain period of time (log retention time TS3) has elapsed from the time when the rollback settlement result log was recorded in the log 900 (S1008).

Figure 11:
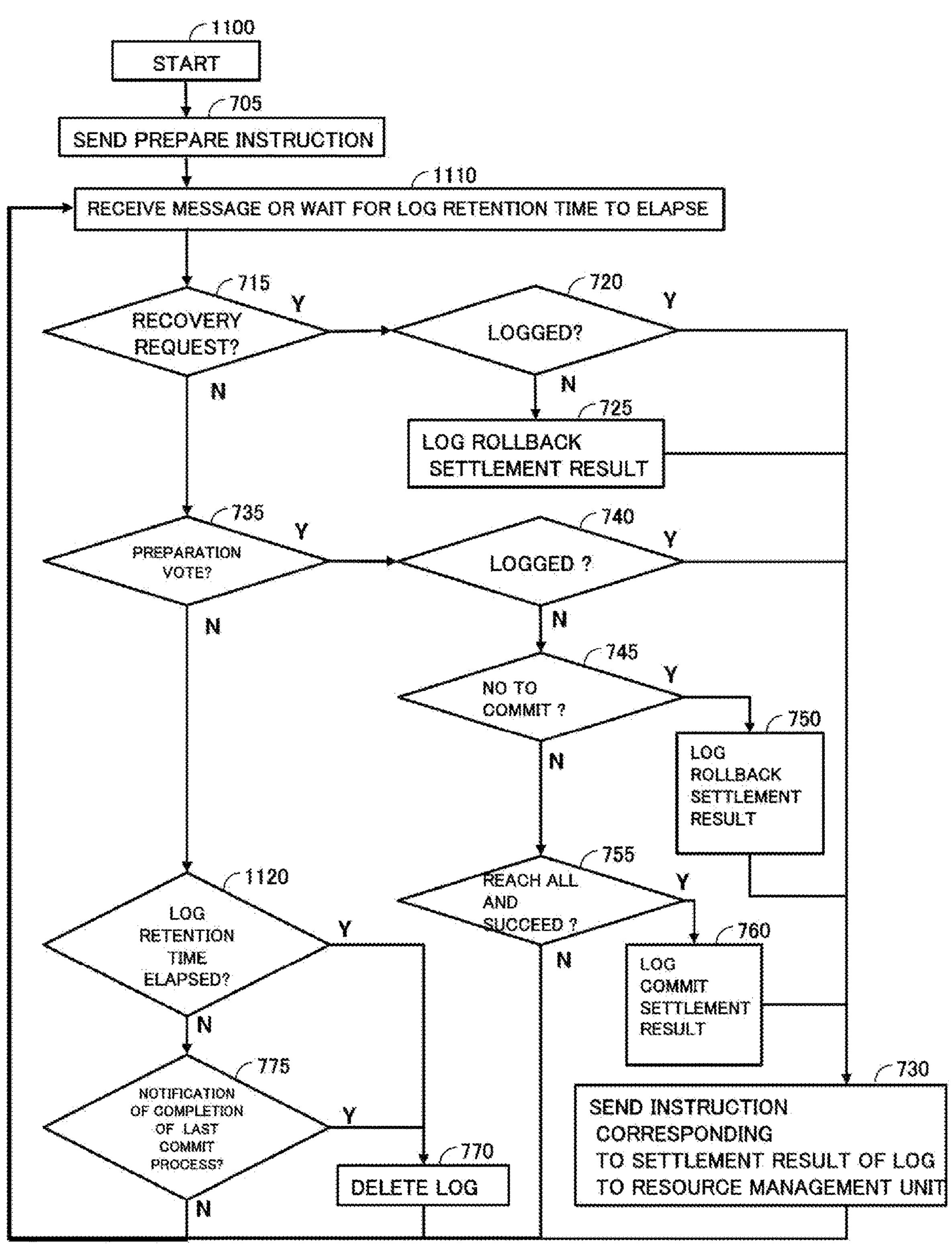
FIG. 11 is a flowchart showing a processing flow executed by the transaction management unit.

FIG. 11 is a flowchart showing the processing flow executed by the transaction management unit 111*a*. This flowchart is similar to that of FIG. 7, except that step 710 of FIG. 7 is replaced by step 1110 and step 765 of FIG. 7 is replaced by step 1120. Therefore, the following explanation focuses on the differences from FIG. 7.

After executing the process of step 705 described above, the transaction management unit 111*a* proceeds to step 1110, waits for a message to be received or for the log retention time TS3 to elapse, and then proceeds to step 715 described above.

When the transaction management unit 111*a* makes a "NO" determination at the processing of step 735 described above and proceeds to step 1120, it determines whether or not the log retention time TS3 has elapsed.

When the log retention time TS3 has elapsed, the transaction management unit 111*a* makes a "YES" determination at step 1120 and proceeds to step 770, executes the previously described step 770, and then returns to step 1010. When the log retention time TS3 has not elapsed, the transaction management unit 111*a* makes a "NO" determination at step 1120 and proceeds to step 775 as previously described.

The transaction management unit 111*a* executes the above process. Thereby, the transaction management unit 111*a* presumes a rollback when it receives the transaction recovery request in a state where the settlement result log does not exist in the log, records (stores) a rollback in the settlement result 112*b* corresponding to the transaction identifier 112*a* of the log 900, and records the recording time in the recording time 112*d*.

When at least one of the preparation votes is preparation failure (NO to commit), the transaction management unit 111*a* assumes that the transaction settlement is a rollback and records (stores) a rollback in the settlement result 112*b* corresponding to the transaction identifier 112*a* for that transaction in the log 900.

When the certain time (log retention time TS3) has elapsed since the rollback resolution log was recorded, the transaction management unit 111*a* deletes the transaction log (the row (record) including the transaction settlement log (a rollback) corresponding to the transaction identifier) from the log 900.

When all of the preparation votes are successful (preparation success (YES to commit)), the transaction management unit 111*a* considers the settlement of the transaction to be a commit, and records (stores) a commit in the settlement result 112*b* corresponding to the transaction identifier of the transaction in the log 900.

When the transaction management unit 111*a* receives a notification of the completion of the commit process from all of the resource management units 211 participating in the transaction, it deletes the transaction's log (the row (record) corresponding to the transaction identifier) from the log 900.

By recording and deleting the transaction settlement result log in this manner, the transaction management unit 111*a* can guarantee the integrity of the distributed transaction while preventing an increase in storage space for recording the log 900.

Effect

As explained above, the transaction management device 100 according to the second embodiment of the present invention can prevent an increase in the storage space of the log 900 (transaction log) while guaranteeing the integrity of distributed transactions.

Third Embodiment

Figure 12:
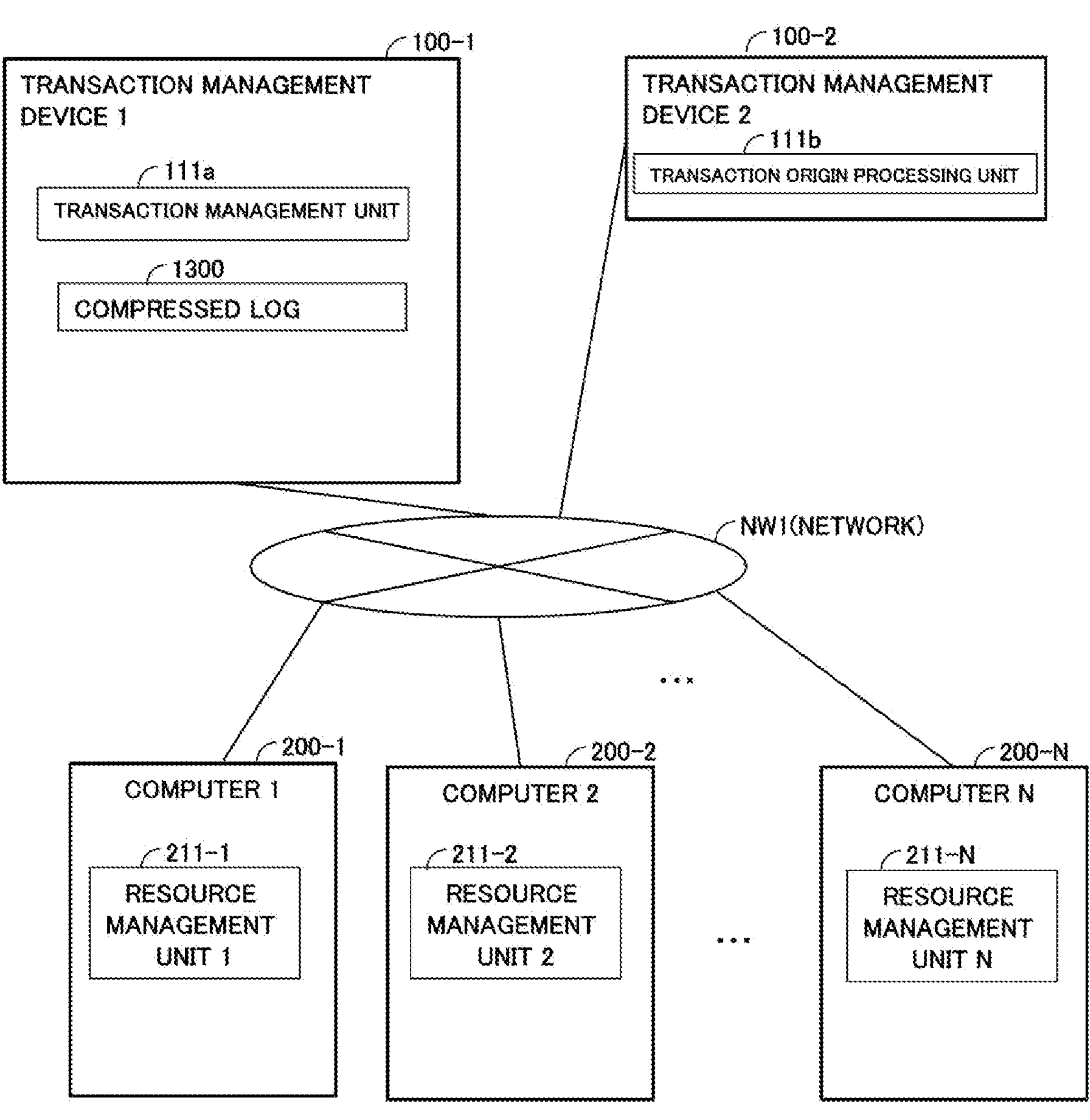
FIG. 12 is a system configuration diagram showing an example configuration of a system including a distributed transaction management device according to the third embodiment of the present invention.

The distributed transaction management device (1) 100-1 and the distributed transaction management device (2) 100-2 according to the third embodiment of the present invention are described. FIG. 12 is a system configuration diagram showing an example configuration of a system (distributed transaction system) including the distributed transaction management device (1) 100-1 and the distributed transaction management device (2) 100-2 according to the third embodiment of the present invention. The "distributed transaction management device (1) 100-1" is referred to as the "transaction management device (1) 100-1," and the distributed transaction management device (2) 100-2 is referred to as the "transaction management device (2) 100-2", hereinafter. The transaction management device (1) 100-1 and the transaction management device (2) 100-2 are referred to as the "transaction management device 100" when there is no need to distinguish between them.

As shown in FIG. 12, the system includes the transaction management devices (1) 100-1, the transaction management device (2) 100-2, computers (1) 200-1 through (N) 200-N. The transaction management device (1) 100-1, the transaction management device (2) 100-2, and computers (1) 200-1 through (N) 200-N are connected to each other through network NW1. They are connected to each other through the network NW1 to enable communication.

The transaction management device (1) 100-1 has the transaction management unit 111*a* and a compressed log 1300. The hardware configuration of the transaction management device (1) 100-1 is similar to that shown in FIG. 2, except that the program 111 does not include the transaction origin processing unit 111*b* and the log 112 has been replaced by the compressed log 1300.

The hardware configuration of the transaction management device (2) 100-2 is similar to that shown in FIG. 2, except that program 111 does not include the transaction management unit 111*a* and the storage device 110 does not include the log 112.

Figure 13:
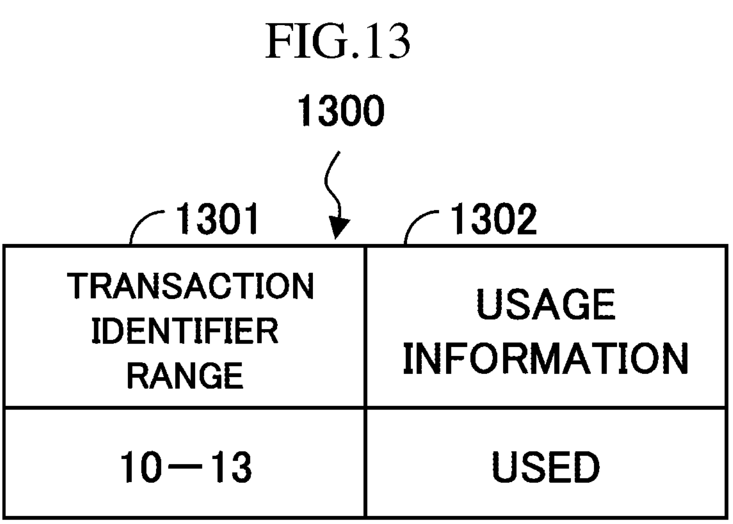
FIG. 13 illustrates compressed log.

The transaction management device (1) 100-1 maintains (stores) the compressed log 1300 shown in FIG. 13 in the storage device 110. As shown in FIG. 13, the compressed log 1300 includes a transaction identifier range 1301 and usage information 1302 as columns (columns) for storing information (values). The compressed log 1300 stores the information corresponding to each column regarding the transaction settlement results as row units of information (records) in correspondence with each other. Specifically, the transaction identifier range 1301 contains a range of TR identification numbers, which are transaction identifiers. "Used" is stored in the usage information 1302.

It should be noted that the "used" stored in the usage information 1302 may also be referred to as the "settlement result log" or the "transaction settlement result log" for convenience.

Overview

Figure 14A:
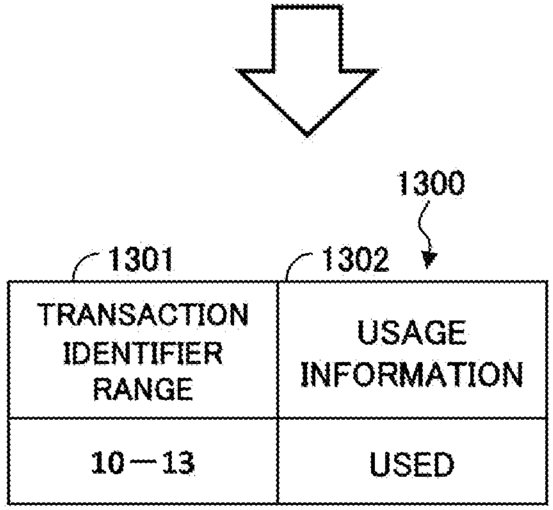
FIG. 14A shows an overview of the distributed transaction management device according to the third embodiment.

The transaction management unit 111*a* temporarily records information about each transaction as an uncompressed log 1400 (that is, the log before compression) shown in FIG. 14*a* in the storage device 110 of the transaction management device (1) 100-1. The uncompressed log 1400 includes a transaction identifier 1401, a settlement result 1402, and a processing information 1403 as columns (columns) that store information (values). Although not shown in the figure, the uncompressed log 1400 includes a column (column) similar to the list of resource management identifiers 112*c* in FIG. 3. This column (column) contains a list of the resource management units 211 participating in the transaction indicated by the TR identification number stored in the transaction identifier 1401.

The transaction identifier 1401 contains the TR identification number, which is the transaction identifier. The settlement result 1402 contains either R or C, indicating the settlement result of the transaction, or unused. It should be noted that R indicates a rollback, and C indicates a commit. When the corresponding settlement result is C, the processing information 1403 contains either "commit settlement" (not shown) or "processed".

The "commit settlement" indicates a state in which the transaction has been settled with a commit, but the commit process of the transaction by the resource management unit 211 participating in the transaction has not yet been completed. "Processed" is a state in which the processing of the commit by the resource management unit 211 participating in the transaction has been completed (settled). The processing information 1403 is "Null" if the corresponding settlement result is "R".

The transaction management unit 111*a* compresses (converts) the uncompressed log 1400 to create the compressed log 1300 and records the compressed log 1300 permanently (long-term) in the storage device 110. This allows the transaction management device 100-1 to guarantee the integrity of distributed transactions while preventing an increase in the storage space for transaction log.

The method of compressing the uncompressed log 1400 into the compressed log 1300, which is performed by the transaction management unit 111*a*, is described below. As mentioned above, the transaction identifier 1401 of the uncompressed log 1400 shown in FIG. 14A contains the TR identification number. A predetermined range of TR identification numbers (in this example, TR identification numbers from 10 to 19) is assigned to the transaction origin processing unit 111*b* to assign TR identification numbers to transactions. It should be noted that the predetermined TR identification number range in this example is only an example and is not limited to this.

The transaction origin processing unit 111*b* assigns a number to each of the multiple transactions, starting with the smallest number in the pre-assigned range of TR identification numbers (in this example, TR identification numbers from 10 to 19) (in this example, from 10, the smallest number).

While the processing of multiple transactions is in progress, the transaction management unit 111*a* compresses the uncompressed log 1400 by referring to the transaction identifier 1401, the settlement result 1402 corresponding to the TR identification number and the processing information 1403 in the uncompressed log 1400 at a predetermined timing.

The transaction management unit 111*a* converts the TR identification numbers (in the example in FIG. 14A, TR identification numbers from 10 to 13) corresponding to a plurality of transactions that have been settled in the uncompressed log 1400 and have consecutive TR identification numbers into information indicating the range of the plurality of TR identification numbers (in FIG. 14A example, 10-13). The transaction management unit 111*a* associates information indicating that the TR identification number has been used (used) with the range of the TR identification number.

Thereby, the transaction management unit 111*a* compresses the uncompressed log 1400, creates the compressed log 1300, and permanently stores the compressed log 1300 in the storage device 110. The TR identification number corresponding to the multiple transactions that have been settled is the TR identification number corresponding to R or C for the settlement result 1402 in the uncompressed log 1400. The C mentioned above is the C for which the corresponding processing information 1403 has been processed.

Figure 14B:
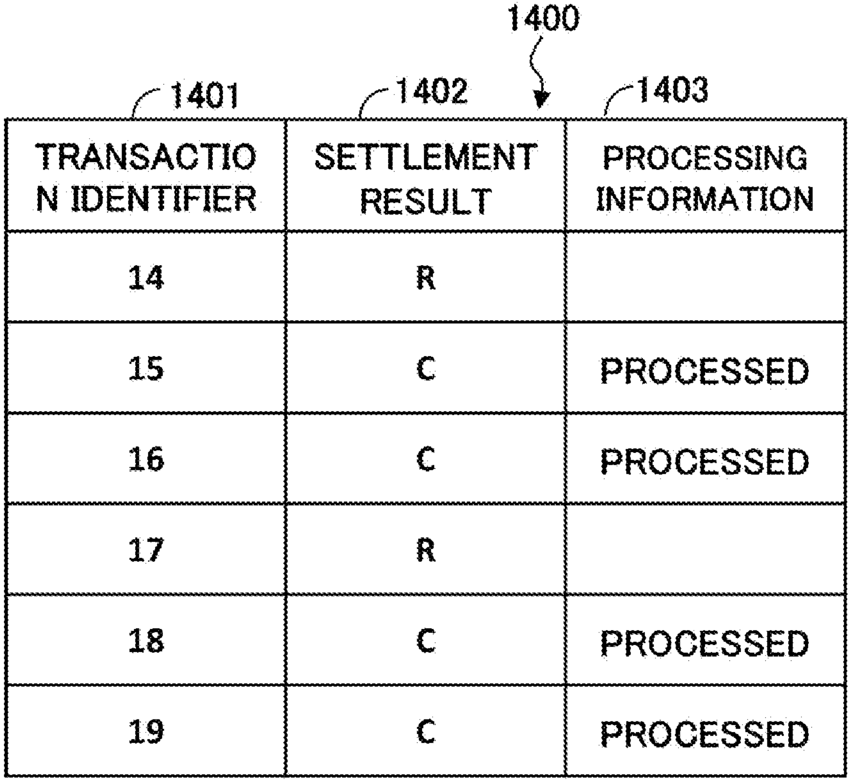
FIG. 14B shows an overview of the distributed transaction management device according to the third embodiment.

Thereafter, as shown in FIG. 14B, the transaction origin processing unit 111*b* assigns a TR identification number, which is a transaction identifier, to the transaction, and as the processing of multiple transactions proceeds, suppose that the uncompressed log 1400 is compressed in a state where the transactions corresponding to TR identification numbers 14 through 19 of the uncompressed log 1400 have been settled. In this case, the transaction management unit 111*a* converts the TR identification numbers 14 to 19 (TR identification numbers 14 to 19 whose corresponding transactions have been settled and whose TR identification numbers are consecutive) into information indicating the range of multiple TR identification numbers and associates the converted transaction identifier number range with information indicating that it has been used (used) (that is, used is stored in the usage information 1302). Thereby, the transaction management unit 111*a* then compresses the uncompressed log 1400, creates the compressed log 1300, and permanently stores the compressed log 1300 in the storage device 110.

The transaction management unit 111*a* uses the compressed log 1300 when it receives the recovery request of the transaction, for example. In this case, the transaction management unit 111*a* refers to the compressed log 1300 and determines that the transaction is a rollback if the usage information corresponding to the TR identification number range that includes the TR identification number of the transaction is "used". Thus, for example, even if the order of processing is switched as shown in FIG. 6, inconsistencies in transactions can be avoided.

When the transaction origin processing unit 111*b* stops due to failure or other reasons, the transaction management unit 111*a* may make all the usage information corresponding to the range of TR identification numbers assigned to that the transaction origin processing unit 111*b* used.

Operation

Figure 15:
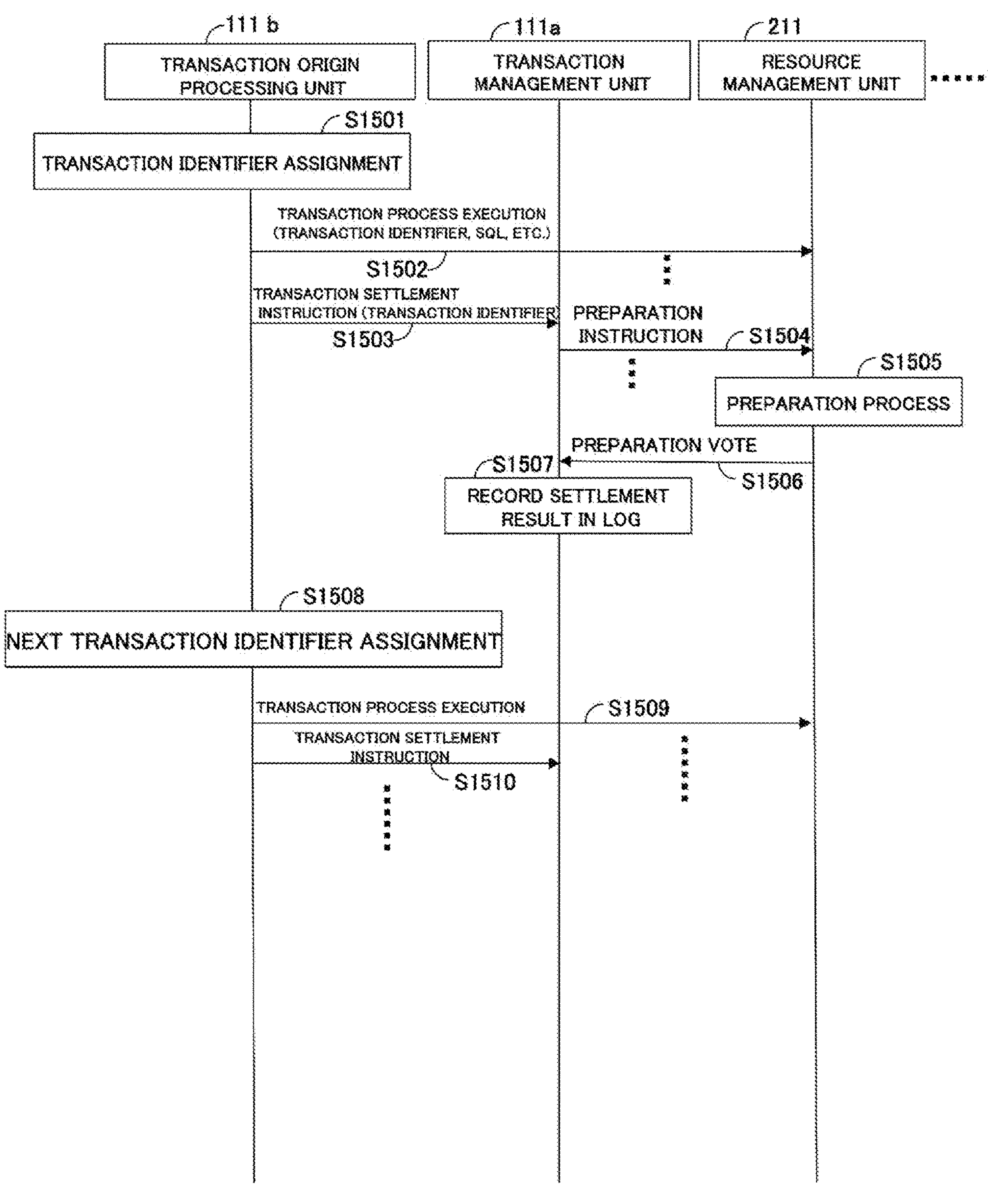
FIG. 15 is a sequence diagram to explain the operation of the transaction origin processing unit, the transaction management unit, and the resource management unit.

FIG. 15 shows a sequence diagram to illustrate the processing performed by the transaction origin processing unit 111*b*, the transaction management unit 111*a*, and the resource management unit 211. The transaction origin processing unit 111*b*, the transaction management unit 111*a*, and the resource management unit 211 execute the processes S1501 through S1510 described below in order.

S1501: The transaction origin processing unit 111*b* assigns TR identification numbers, which are transaction identifiers, to transactions. At this time, the transaction origin processing unit 111*b* assigns TR identification numbers in increasing order from the range of TR identification numbers previously assigned to the transaction origin processing unit 111*b* (in this example, TR identification numbers from 10 to 19).

S1502: The transaction origin processing unit 111*b* sends the transaction identifier, SQL, etc. to the resource management unit 211 and instructs the multiple resource management units 211 participating in the transaction to execute transaction processing.

S1503: The transaction origin processing unit 111*b* instructs the transaction management unit 111*a* to settle the transaction by sending the transaction identifier to the transaction management unit 111*a*.

S1504: When the transaction management unit 111*a* receives a transaction settlement instruction from the transaction origin processing unit 111*b*, it initiates the completion process (commit or rollback) of the transaction corresponding to the transaction identifier received from the transaction origin processing unit 111*b*. The transaction management unit 111*a* sends the preparation instructions to the multiple resource management units 211 participating in the transaction.

S1505: The multiple resource management units 211 participating in the transaction respond to the preparation instruction from the transaction management unit 111*a* and execute the preparation process.

S1506: Each of the multiple resource management units 211 participating in the transaction sends the preparation vote to the transaction management unit 111*a*.

S1507: The transaction management unit 111*a* records the transaction settlement result in the log (the uncompressed log 1400). This uncompressed log 1400 is compressed (converted) into the compressed log 1300 at a predetermined timing by executing the processing flow described in FIGS. 16 and 17 below.

S1508: The transaction origin processing unit 111*b* assigns the next sequential TR identification number of the TR identification number assigned in S1501 as the transaction identifier for the transaction. For example, in this example, the TR identification number assigned in S1501 is 10, and 11, the next sequential TR identification number after 10, is assigned.

S1509: The transaction origin processing unit 111*b* sends the transaction identifier and SQL, etc. to the resource management unit 211 and instructs the multiple resource management units 211 participating in the transaction to execute the transaction process.

S1510: The transaction origin processing unit 111*b* instructs the transaction management unit 111*a* to settle the transaction by sending the transaction identifier to the transaction management unit 111*a*.

Thereafter, the transaction origin processing unit 111*b*, the transaction management unit 111*a*, and the resource management unit 211 process multiple transactions by repeating S1504 through S1508 for the corresponding number of transactions that need to be processed.

Figure 16:
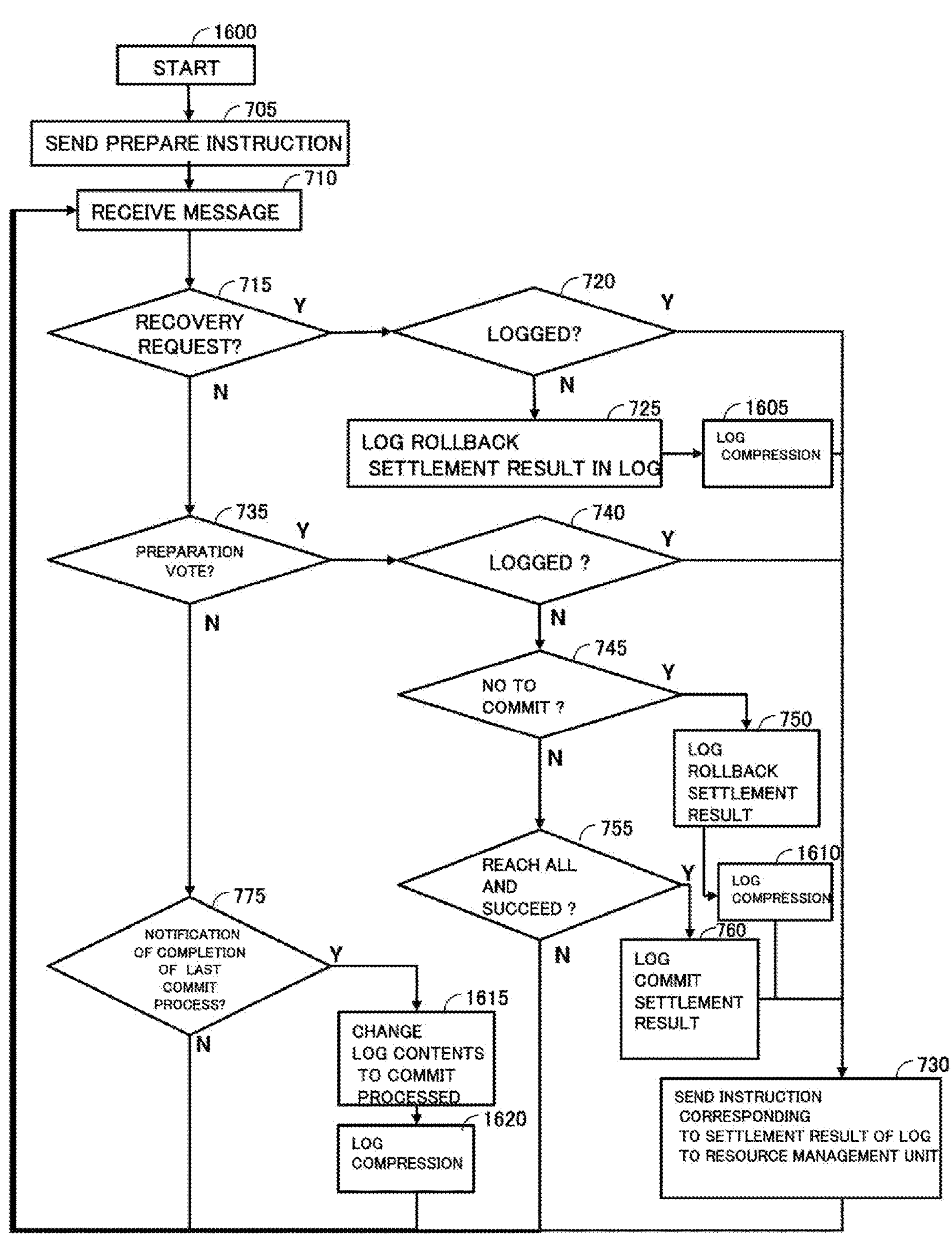
FIG. 16 is a flowchart showing the processing flow executed by the transaction management unit.

FIG. 16 is a flowchart showing the processing flow executed by the transaction management unit 111*a*. This flowchart is similar to the flowchart in FIG. 7 except that step 1605 is added between step 725 and step 730, step 1610 is added between step 750 and step 730, step 1615 and step 1620 are added after step 775, and step 765 is deleted.

The processing of steps 720, 725, 730, 740, 750, 760, and 775, which have the same reference code as the processing of FIG. 7 in the flowchart of FIG. 16, differs from the processing of FIG. 7 in that the compressed log 1300 and/or the uncompressed log 1400 is used instead of the log 112. Therefore, the following discussion focuses on the differences from FIG. 7.

At step 720, the transaction management unit 111*a* determines whether the log (settlement result log) for the transaction subject to the recovery request has already been recorded in the compressed log 1300 or the uncompressed log 1400. When the log (settlement result log) for the transaction subject to the recovery request has not already been recorded in the compressed log 1300 and has not already been recorded in the uncompressed log 1400, the transaction management unit 111*a* makes a "NO" determination at step 720 and proceeds to step 725. At step 725, since the log (settlement result log) for the transaction for which the recovery request is made has not already been recorded in the compressed log 1300 and the uncompressed log 1400, the transaction management unit 111*a* presumes that the transaction settlement is a rollback, and stores/records the rollback settlement result in the settlement result 112*b* of the uncompressed log 1400.

The transaction management unit 111*a* then proceeds to step 1605 to compress the uncompressed log 1400 to create the compressed log 1300, and then proceeds to step 730.

At step 730, the transaction management unit 111*a* sends instructions corresponding to the usage information 1302 of the compressed log 1300 or the settlement result 1402 of the uncompressed log 1400 to the resource management unit 211 and returns to step 710.

When, at step 720, the log (settlement result log) for the transaction subject to the recovery request has already been recorded in the compressed log 1300 or the uncompressed log 1400, the transaction management unit 111*a* makes a "YES" determination at step 720 and proceeds directly to step 730, executes the previously described step 730, and then returns to step 710.

At step 740, the transaction management unit 111*a* determines whether the log (settlement result log) about the transaction has already been recorded in the compressed log 1300 or the uncompressed log 1400.

When the log (settlement result log) about the transaction has already been recorded in the compressed log 1300 or the uncompressed log 1400, the transaction management unit 111*a* makes a "YES" determination at step 740 and proceeds to step 730, executes the previously described step 730, and then returns to step 710.

When the log (settlement result log) about the transaction is not already recorded in the compressed log 1300 and not already recorded in the uncompressed log 1400, the transaction management unit 111*a* makes a "NO" determination at step 740 and proceeds to step 745.

When the transaction management unit 111*a* makes a "YES" determination at step 745 and proceeds to step 750, it records the rollback settlement result in the uncompressed log 1400, then proceeds to step 1610, compresses the uncompressed log 1400, creates the compressed log 1300, and then proceeds to step 730.

The transaction management unit 111*a* makes a "YES" determination at step 755 and proceeds to step 760, and since the preparation vote results of all the resource management units 211 participating in the transaction are successful (preparation success (YES to commit)), the transaction is settled as a commit and the commit settlement result is recorded in the settlement result 112*b* of the uncompressed log 1400.

At step 775, the transaction management unit 111*a* determines whether the message is the last commit process completion notification from the resource management unit 211 participating in the transaction, based on the list of resource management units 211 participating in the transaction in the uncompressed log 1400. When the message is the last commit process completion notification, the transaction management unit 111*a* makes a "YES" determination at step 775, performs steps 1615 and 1620 described below in sequence, and then returns to step 710.

Step 1615: The transaction management unit 111*a* changes the content (processing information 1403) of the log (the uncompressed log 1400) from "commit settlement" to commit processed ("processed").

Step 1620: The transaction management unit 111*a* compresses the uncompressed log 1400, creates the compressed log 1300, and then returns to step 710.

Figure 17:
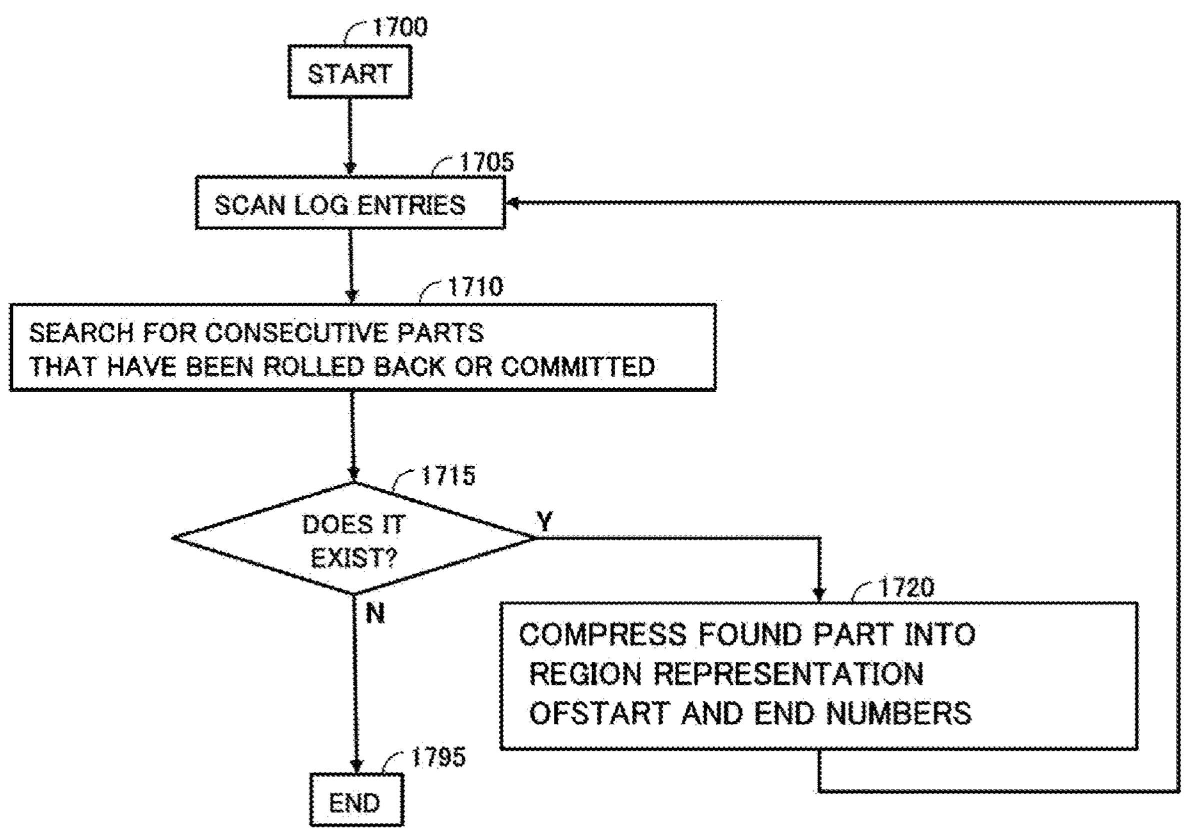
FIG. 17 shows a flowchart of the log compression process flow executed by the transaction management unit.

FIG. 17 is a flowchart showing the processing flow of log compression performed by transaction management unit 111*a*. When the transaction management unit 111*a* proceeds to the processing of log compression (step 1605, step 1610, step 1615 or step 1620) in FIG. 16, it starts processing from step 1700, executes steps 1705 and 1710 described below in sequence, and then proceeds to step 1715.

Step 1705: The transaction management unit 111*a* scans the log entries (rows (records)) in the uncompressed log 1400.

Step 1710: The transaction management unit 111*a* searches for the part where the rollback or commit process has been completed consecutively. It should be noted that a rolled-back part is a part (row (record)) for which the settlement result 1402 is "R", and a committed processed part is a part (row (record)) for which the settlement result 1402 is "C" and the processing information 1403 is "processed".

At step 1715, the transaction management unit 111*a* determines whether or not there is a contiguous part that has been a rollback or a commit (processed) (i.e., a contiguous part of rows (records) in which "C" or "R" is stored in the uncompressed log 1400).

When there is the contiguous part that has been a rollback or a commit (processed), the transaction management unit 111*a* makes a "YES" determination at step 1715 and proceeds to step 1720. At step 1720, the transaction management unit 111*a* creates the compressed log 1300 by compressing the part with consecutive rollback or committed processed portions by converting them to a range of TR identification numbers and used, as described above, and returns to step 1705.

When there is no contiguous part that has been a rollback and no contiguous part that has been a commit (processed), the transaction management unit 111*a* makes a "NO" determination at step 1715 and proceeds to step 1795 to temporarily terminate this processing flow.

Effect

As explained above, the transaction management device 100 according to the third embodiment of the present invention can prevent an increase in the storage space of transaction log while guaranteeing the integrity of distributed transactions by compressing and recording the settlement result log of transactions that occur in large volumes.

Fourth Embodiment

Figure 18:
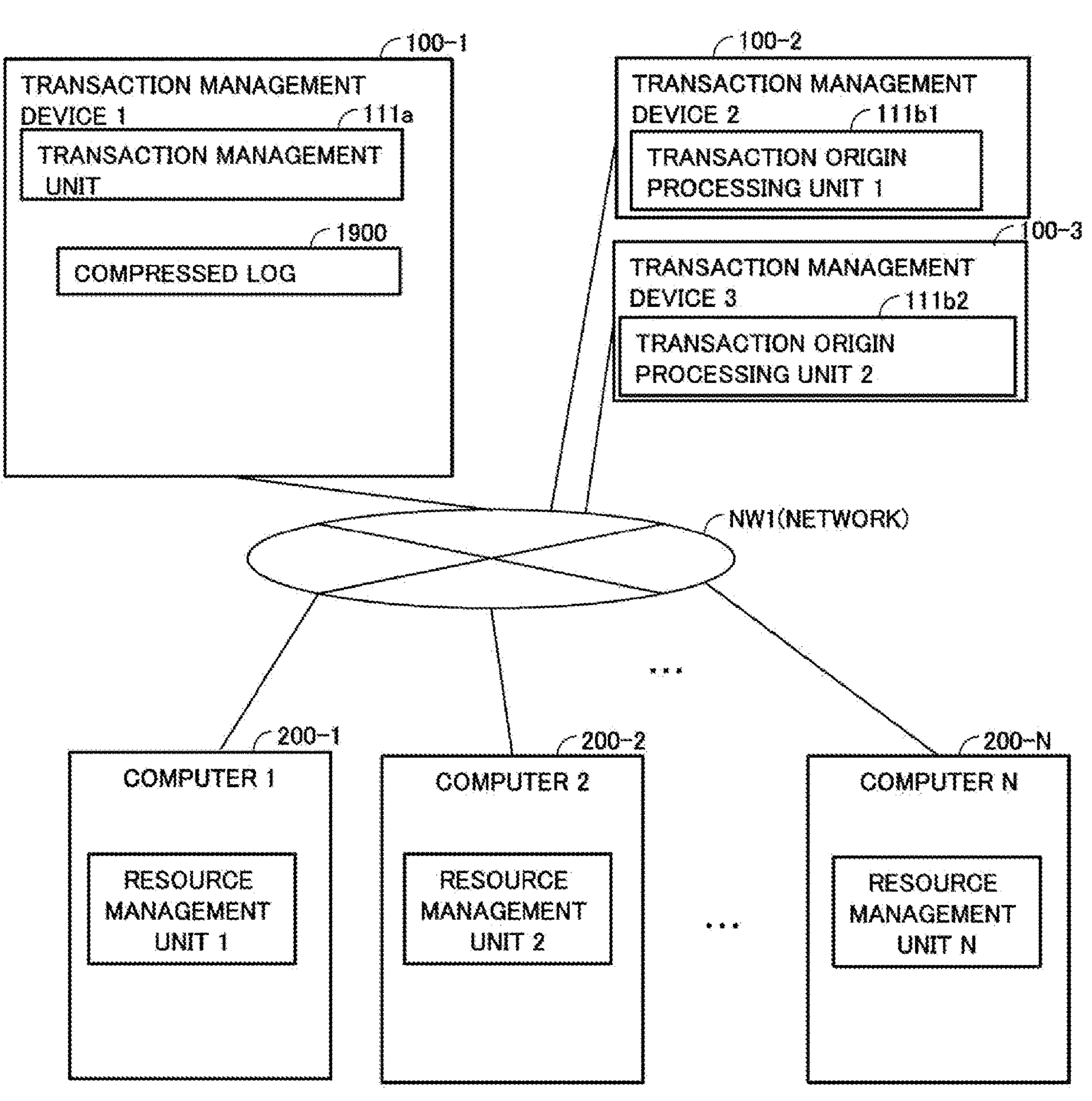
FIG. 18 is a system configuration diagram showing an example configuration of a system including a distributed transaction management device according to the fourth embodiment of the present invention.

The distributed transaction management device (1) 100-1, the distributed transaction management device (2) 100-2 and the distributed transaction management device (3) 100-3 according to the fourth embodiment of the present invention are described. FIG. 18 is a system configuration diagram showing an example of the configuration of a system (distributed transaction system) according to the fourth embodiment of the present invention, the system including the transaction management device 100-1, the transaction management device 100-2 and the transaction management device 100-3. The "distributed transaction management device (1) 100-1" is referred to as the "transaction management device (1) 100-1" and the distributed transaction management device (2) 100-2 is referred to as the "transaction management device (2) 100-2" and the "distributed transaction management device (3) 100-3" is referred to as the "transaction management device (3) 100-3", hereinafter. The transaction management device (1) 100-1, the transaction management device (2) 100-2, and the transaction management device (3) 100-3 are referred to as the "transaction management device 100" when there is no need to distinguish between them.

As shown in FIG. 18, the system includes the transaction management device (1) 100-1, the transaction management device (2) 100-2, the transaction management device (3) 100-3, and the computers (1) 200-1 through (N) 200-N. The transaction management device (1) 100-1, the transaction management device (2) 100-2, the transaction management device (3) 100-3, and computers (1) 200-1 through (N) 200-N are communicably connected to each other via the network NW1.

The transaction management device (1) 100-1 has a transaction management unit 111*a* and a compressed log 1900. The hardware configuration of the transaction management device (1) 100-1 is similar to that shown in FIG. 2, except that the program 111 does not include the transaction origin processing unit 111*b* and the log 112 has been replaced by the compressed log 1900.

The hardware configuration of the transaction management device (2) 100-2 is similar to that shown in FIG. 2, except that the program 111 does not include the transaction management unit 111*a*, the storage device 110 does not include the log 112, and the transaction origin processing unit 111*b* is replaced by the transaction origin processing unit (1) 11*b*1.

The hardware configuration of the transaction management device (3) 100-3 is similar to that shown in FIG. 2, except that the program 111 does not include the transaction management unit 111*a*, the storage device 110 does not include the log 112, and the transaction origin processing unit 111*b* is replaced by the transaction origin processing unit (2) 111*b*2.

Hereafter, the transaction origin processing unit (1) **111*b*1 and the transaction origin processing unit (2) 111*b*2 is referred to as the "transaction origin processing unit 111*b***" when there is no need to specifically distinguish between them.

Figure 19:
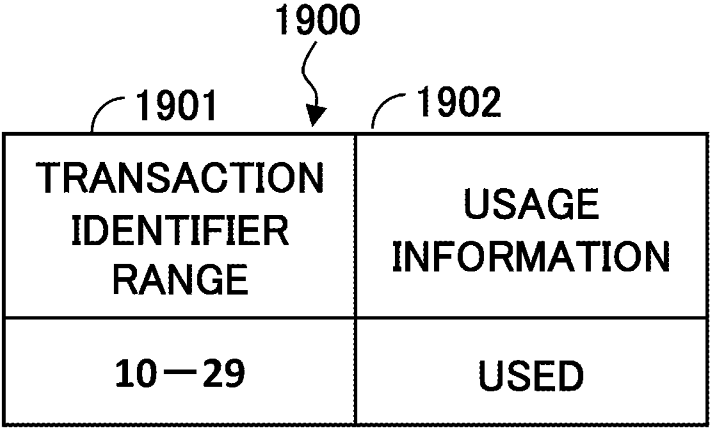
FIG. 19 illustrates the compressed log.

The transaction management device (1) 100-1 maintains (stores) the compressed log 1900 shown in FIG. 19 instead of the log 112. The compressed log 1900 includes a transaction identifier range 1901 and a usage information 1902 as columns (columns) that store information (values). The compressed log 1900 contains information corresponding to each column regarding the transaction settlement results for the transaction origin processing unit (1) **111*b*1 and the transaction origin processing unit (2) 111*b*2, which are associated with each other and stored as row units of information (records). The transaction identifier range 1901 and the usage information 1902 contain the same information as the transaction identifier range 1301 and the usage information 1302 in FIG. 13**.

Overview

The transaction management unit **111*a* temporarily records information about each transaction for each transaction origin processing unit 111*b* in the storage device 110 of the transaction management device (1) 100-1 as the uncompressed log 2000 shown in FIG. 20**A.

Figure 20A:
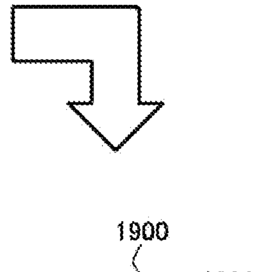
FIG. 20A shows an overview of the distributed transaction management device according to the fourth embodiment.

The uncompressed log 2000 in FIG. 20A includes a transaction identifier 2001, a settlement result 2002, and a processing information 2003 as columns (columns) for storing information (values). Although not shown in the figure, the uncompressed log 2000 includes a column (column) similar to the list of the resource management identifiers **112*c* in FIG. 3. This column (column) contains a list of the resource management units 211 participating in the transaction indicated by the TR identification number stored in the transaction identifier 1401**.

Figure 14B:
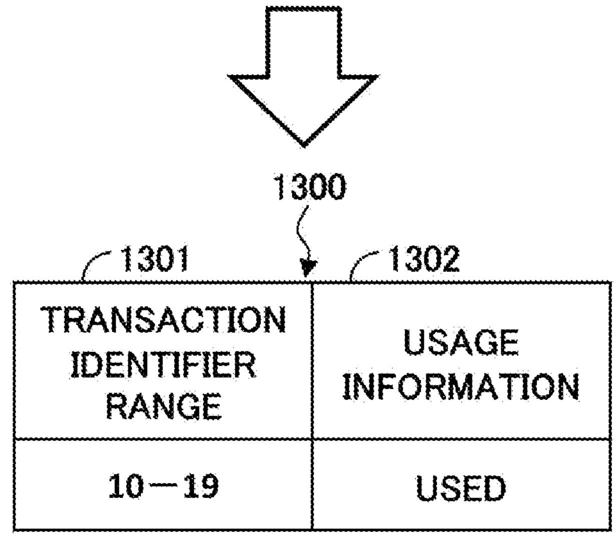

In the uncompressed log 2000 in FIG. 20A, the information corresponding to each column for each transaction to which a TR identification number, which is a transaction identifier, is assigned by each of the transaction origin processing unit (1) **111*b*1 and the transaction origin processing unit (2) 111*b*2 is stored as rows of information (records), which correspond to each other. The information stored in a transaction identifier 2001, a settlement result 2002, and a processing information 2003 is the same as the transaction identifier 1401, the settlement result 1402, and the processing information 1403 in FIG. 14**A described above.

The transaction management unit **111*a* compresses (converts) the uncompressed log 2000 in FIG. 20A to create the compressed log 1900 shown in FIG. 19, and permanently records the compressed log 1900 in the storage device 110. This allows the transaction management device (1) 100-1** to guarantee the integrity of distributed transactions while preventing an increase in the storage space for transaction log.

The method of compressing an uncompressed log 2000 into a compressed log 1900, which is performed by the transaction management unit **111*a*, is described below. As mentioned above, the transaction identifier 2001 of the uncompressed log 2000 contains a TR identification number. A range of TR identification numbers (in this example, TR identification numbers from 10 to 19) is assigned to the transaction origin processing unit (1) 111*b*1, the range of TR identification numbers being a range to assign TR identification numbers to transactions. A range of TR identification numbers (in this example, TR identification numbers from 20 to 29) is assigned to the transaction origin processing unit (2) 111*b*2**, the range of TR identification numbers being a rang to assign a TR identification number to the transaction.

The transaction origin processing unit (1) **111*b*1** assigns a number to each of the multiple transactions, starting with the smallest number in a predetermined range of numbers (numbers from 10 to 19) assigned in advance.

The transaction origin processing unit (2) **111*b*2** assigns a number to each of the multiple transactions, starting with the smallest number in a predetermined range of numbers (numbers from 20 to 29) assigned in advance.

While the processing of multiple transactions is in progress, the transaction management unit **111*a* compresses the uncompressed log 2000 by referring to the TR identification number and the settlement result corresponding to the TR identification number in the uncompressed log 2000 in FIG. 20**A at a predetermined timing.

The transaction management unit **111*a* converts the TR identification numbers (the TR identification numbers from 10 to 13 in the example in FIG. 20A) into information that indicates a range of the TR identification numbers (range of the TR identification numbers (10-13 in the example in FIG. 20A)) and adds/associates the information (used) indicating that the TR identification numbers has been used (used) to/with the range of the TR identification numbers. The above TR identification numbers (the TR identification numbers from 10 to 13 in the example in FIG. 20A) to be converted correspond to multiple transactions that have been settled and have consecutive TR identification numbers in the uncompressed log 2000 for the transaction origin processing unit (1) 111*b*1**.

The transaction management unit **111*a* converts the TR identification numbers (the TR identification numbers from 20 to 23 in the example in FIG. 20A) into information that indicates a range of the TR identification numbers (range of the TR identification numbers (20-23 in the example in FIG. 20A)) and adds/associates the information (used) indicating that the TR identification numbers has been used (used) to/with the range of the TR identification numbers. The above TR identification numbers to be converted (the TR identification numbers from 20 to 23 in the example in FIG. 20A) correspond to multiple transactions that have been settled and have consecutive TR identification numbers in the uncompressed log 2000 for the transaction origin processing unit (2) 111*b*2**.

This causes the transaction management unit **111*a* to compress the uncompressed log 2000, create a compressed log 1900, and permanently store the compressed log 1900 in the storage device 110**.

Figure 20B:
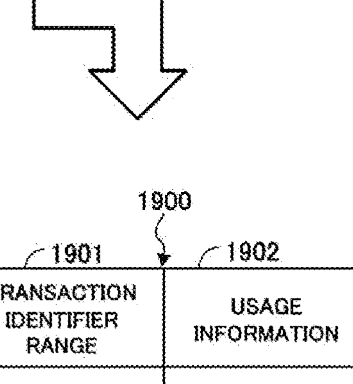
FIG. 20B shows an overview of the distributed transaction management device according to the fourth embodiment.

Thereafter, as shown in FIG. 20B, each of the transaction origin processing unit (1) **111*b*1 and the transaction origin processing unit (2) 111*b*2 then assigns a TR identification number, which is a transaction identifier, to the transaction, and as the processing of multiple transactions proceeds, suppose that the uncompressed log 2000 is compressed in a state where the transactions corresponding to TR identification numbers 14 through 19 and 24 through 29 of the uncompressed log 2000** have been settled.

In this case, the transaction management unit **111*a* converts the TR identification numbers 14 to 19 and 24 to 29 into information indicating the range of a plurality of TR identification numbers, and adds/associates information (used) indicating that the TR identification (used) numbers have been used to/with the range of the TR identification numbers. The above converted information (range of TR identification numbers (10-29 in the example of FIG. 20**B))

indicates the range of multiple TR identification numbers added to the range of TR identification numbers of the compressed log 1900 shown in FIG. 20A. Thereby, the transaction management unit 111*a* then compresses the uncompressed log 2000, creates a compressed log 1900, and permanently stores the compressed log 1900 in the storage device 110.

Operation

Figure 21:
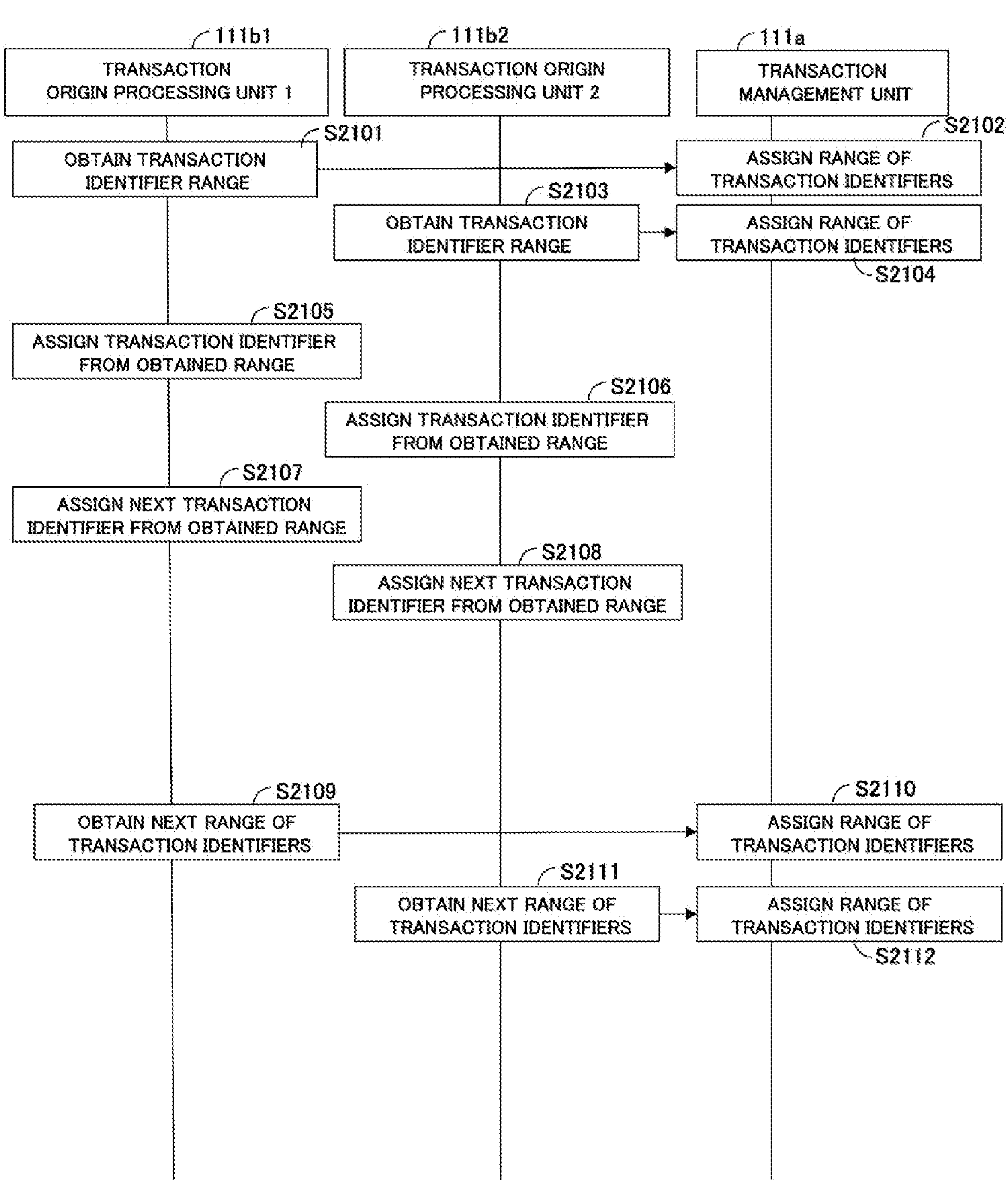
FIG. 21 is a sequence diagram to explain the operation of the transaction origin processing unit (1), the transaction origin processing unit (2), and a transaction manager unit.

FIG. 21 is a sequence diagram illustrating the processing of the transaction origin processing unit (1) 111*b*1, the transaction origin processing unit (2) 111*b*2, and the transaction management unit 111*a*. This sequence diagram describes the process when a range of transaction identifiers is assigned to each transaction origin processing unit 111*b* in increasing order, and each transaction origin processing unit 111*b* assigns a transaction identifier to the transaction from that assigned range to a transaction. For example, the range of the transaction identifiers is a range that is numbered in order by a predetermined number Y from the originating number X, and the ranges generated in order are assigned in sequence.

For example, the range of the Nth transaction identifier is generated by a predetermined number Y from the number X, which is numbered sequentially (the number of numbers numbered includes the number X). Here, $X=X0+(Y\times(N-1))$. In this example, X0=10 and Y=10. In this case, the range of the first transaction identifier is 10 to 19, by numbering only 10 from number 10. The second transaction identifier range number X is 20 (=10+(10×(2−1))) and is numbered from 20 to 29 by numbering only 10 from the number 20. The third transaction identifier range number X is 30 (=10+(10×(3−1))) and is numbered from 30 to 39 by numbering only 10 from the number 30.

The transaction origin processing unit (1) 111*b*1, the transaction origin processing unit (2) 111*b*2, and the transaction management unit 111*a* execute the processes S2101 through S2112 described below in order.

S2101: The transaction origin processing unit (1) 111*b*1 obtains a range of transaction identifiers (a range of transaction identifiers in the smallest order (e.g., a range of TR identification numbers from 10 to 19)).

S2102: The transaction management unit 111*a* assigns a range of transaction identifiers (e.g., a range of TR identification numbers from 10 to 19) to the transaction origin processing unit (1) 11*b*1.

S2103: The transaction origin processing unit (2) 111*b*2 obtains the next range of transaction identifiers in the sequence (e.g., the range of TR identification numbers from 20 to 29).

S2104: The transaction management unit 111*a* assigns a range of transaction identifiers (e.g., TR identification numbers from 20 to 29) to the transaction origin processing unit (2) 111*b*2.

S2105: The transaction origin processing unit (1) 111*b*1 assigns a transaction identifier, TR identification number (10), to the transaction from the obtained range (e.g., the range of TR identification numbers from 10 to 19).

S2106: The transaction origin processing unit (2) 111*b*2 assigns a transaction identifier, TR identification number (20), to the transaction from the obtained range (e.g., TR identification numbers from 20 to 29).

S2107: The transaction origin processing unit (1) 111*b*1 assigns the next transaction identifier, TR identification number (11), from the obtained range (e.g., from 10 to 19 TR identification numbers) to the transaction.

S2108: The transaction origin processing unit (2) 111*b*2 assigns the next transaction identifier (21) from the obtained range (e.g., TR identification numbers from 20 to 29) to the transaction.

S2119: When all TR identification numbers in the obtained range (e.g., TR identification numbers from 10 to 19) are assigned to transactions, the transaction origin processing unit (1) 111*b*1 obtains the next range (for example, TR identification numbers from 30 to 39) of the currently used transaction identifier range (the range of TR identification numbers from 10 to 29).

S2110: The transaction management unit 111*a* assigns a range of transaction identifiers (range of TR identification numbers from 30 to 39) to the transaction origin processing unit (1) 11*b*1.

S2111: When all TR identification numbers in the obtained range (e.g., TR identification numbers from 20 to 29) are assigned to the transactions, the transaction origin processing unit (1) 111*b*2 obtains the next range (for example, TR identification numbers from 40 to 49) of the currently used transaction identifier range (the range of TR identification numbers from 10 to 39).

S2112: The transaction management unit 111*a* assigns a range of transaction identifiers (e.g., TR identification numbers from 40 to 49) to the transaction origin processing unit (2) 111*b*2.

By performing the above actions, the transaction management unit 111*a* assigns a range of transaction identifiers to each transaction origin processing unit 111*b*.

Furthermore, by executing the processing flow shown in the flowcharts in FIGS. 16 and 17 above, the transaction management unit 111*a* records the transaction settlement result log corresponding to the TR identification number assigned to the transaction, and also compresses the recorded transaction settlement result log. This allows the transaction management device 100-1 to guarantee the integrity of the distributed transaction while preventing an increase in the storage space of the transaction log.

Effect

As explained above, the transaction management device 100-1 according to the fourth embodiment of the present invention compresses and records the settlement result log of the transactions that occur in large volumes, thereby guaranteeing the integrity of distributed transactions and preventing the storage space of the transaction log.

Modified Examples

The present invention is not limited to the above embodiments, and various variations may be employed within the scope of the invention. Furthermore, the above embodiments can be combined with each other as long as they do not depart from the scope of the invention.

In the second embodiment, after the rollback settlement by the recovery process request, the rollback settlement result log may be deleted after a predetermined time has elapsed from the time when the transaction settlement by the preparation vote was done.

The transaction management device 100 may be configured to perform any of the first deletion and the second deletion. The first deletion is the method for deleting the rollback transaction settlement result log in the transaction management device 100 according to the first embodiment. The second deletion is the method for deleting the rollback transaction settlement result log in the transaction management device 100 according to the second embodiment. In this case, the transaction management device 100 may be configured to select and execute any of the first deletion and the second deletion depending on the system environment.

The present invention can also be configured as follows.

A distributed transaction management device applied to a distributed transaction system in a specific environment, the distributed transaction management device comprising a storage device that records transaction settlement result log indicating a settlement result of a transaction of the distributed transaction system and an information processing device that manages the transaction settlement result log, wherein, the information processing devise is configured to perform any one of a first deletion and a second deletion selectively depending on the environment of the distributed transaction system, the first deletion being a process that deletes the transaction settlement result log indicating a rollback when receiving a rollback process completion notification from any one of multiple resource management units, the second deletion being a process that deletes the transaction settlement result log indicating a rollback after a certain period of time has elapsed after the transaction settlement.

A distributed transaction management method applied to a distributed transaction system in a specific environment, the distributed transaction management method executed by an information device comprising a storage device that records transaction settlement result log indicating a settlement result of a transaction of the distributed transaction system, the distributed transaction management method managing the transaction settlement result log, wherein, the distributed transaction management method includes deleting, when receiving a rollback process completion notification from any one of multiple resource management units participating in the transaction, the transaction settlement result log indicating a rollback.

A distributed transaction management method applied to a distributed transaction system in a specific environment, the distributed transaction management method executed by an information device comprising a storage device that records transaction settlement result log indicating a settlement result of a transaction of the distributed transaction system, the distributed transaction management method managing the transaction settlement result log, wherein, the distributed transaction management method includes deleting, after a certain time has elapsed after transaction settlement of a rollback done due to a recovery request from any one of multiple resource management units participating in the transaction, the transaction settlement result log indicating the rollback.

A distributed transaction management method applied to a distributed transaction system in a specific environment, the distributed transaction management method executed by an information device comprising a storage device that records transaction settlement result log indicating a settlement result of a transaction of the distributed transaction system, the distributed transaction management method managing the transaction settlement result log, wherein, the distributed transaction management method includes:

using a transaction identification number having a large/small relationship as a transaction identifier to identify the transaction;

converting a plurality of consecutive transaction identification numbers corresponding to a settled transaction into range information indicating a range of the consecutive transaction identification numbers;

associating used information indicating that the information has been used with the converted range information to thereby compress the transaction settlement result log, so as to create a compressed log; and recording the compressed log in the storage device.

What is claimed is:

1. A distributed transaction management device applied to a distributed transaction system, the distributed transaction management device comprising:

a storage device storing a transaction settlement result log indicating settlement results of transactions of the distributed transaction system; and an information processing device, coupled to a plurality of resource management units of the distributed transaction system, that manages the transaction settlement result log, wherein the information processing device is configured to:

issue a preparation instruction of a transaction to each resource management unit, receive a recovery request from a first resource management unit of the plurality of resource management units, and in response to receiving the recovery request:

record a rollback as a settlement result in the transaction settlement result log and issue a rollback instruction to the first resource management unit, receive a preparation vote from a second resource management unit of the plurality of resource management units, and in response to the preparation vote, issue a rollback instruction to at least the first resource management unit and the second resource management unit, wherein (1) a recovery process activation timeout time+a minimum value of a recovery request communication time<a maximum value of a preparation vote communication time, and (2) a maximum value of the preparation vote communication time<a processing delay time for activating the recovery process are satisfied, and receive a rollback complete notification from any of the resource management units and in response to receiving the rollback complete notification, delete the rollback as the settlement result in the transaction settlement result log.

2. The distributed transaction management device according to claim 1, wherein the information processing device is configured to:

issue the recovery request to the first resource management unit before receiving a preparation vote from the first resource management unit.

3. The distributed transaction management device according to claim 1, wherein the information processing device is configured to:

when there is no transaction settlement result log corresponding to the transaction in a case where the recovery request is received from the first resource management unit, determine that the transaction settlement result is a rollback and record the rollback as the settlement result in the transaction settlement result log record.

4. A distributed transaction management device applied to a distributed transaction system, the distributed transaction management device comprising:

a storage device storing a transaction settlement result log indicating settlement results of transactions of the distributed transaction system; and an information processing device, coupled to a plurality of resource management units of the distributed transaction system, that manages the transaction settlement result log, wherein the information processing device is configured to:

issue a preparation instruction of a transaction to each resource management unit, receive a recovery request from a first resource management unit of the plurality of resource management units, and in response to the recovery request:

record a rollback as a settlement result in the transaction settlement result log and issue a rollback instruction to the first resource management unit, receive a preparation vote from a second resource management unit of the plurality of resource management units, and in response to the preparation vote, issue a rollback instruction to at least the first resource management unit and the second resource management, wherein (1) a recovery process activation timeout time+a minimum value of a recovery request communication time<the maximum value of a preparation vote communication time, (2) a maximum value of the preparation vote communication time<the processing delay time for activating the recovery process, and (3) the maximum value of the preparation vote communication time<the recovery process activation timeout time+the minimum recovery request communication time+a log retention time are satisfied, and after a predetermined time has elapsed after the rollback as the settlement result was recorded in the transaction settlement result log, delete the rollback as the settlement result in the transaction settlement result log.

5. The distributed transaction management device according to claim 4, wherein the information processing device is configured to:

issue the recovery request to the first resource management unit before receiving a preparation vote from the first resource management unit.

6. The distributed transaction management device according to claim 4, wherein the information processing device is configured to:

when there is no transaction settlement result log corresponding to the transaction in a case where the recovery request is received from the first resource management unit, determine that the transaction settlement result is a rollback and record the rollback as the settlement result in the transaction settlement result log record.

7. A distributed transaction management method applied to a distributed transaction system, the distributed transaction management method executed by an information device, the method comprising:

storing, in a storage device, a transaction settlement result log indicating settlement results of a transactions of the distributed transaction system, issuing a preparation instruction of a transaction to each resource management unit;

receiving a recovery request from a first resource management unit of the plurality of resource management units, and in response to the recovery request: record a rollback as a settlement result in the transaction settlement result log and issue a rollback instruction to the first resource management unit;

receiving a preparation vote from a second resource management unit of the plurality of resource management units, and in response to the preparation vote, issue a rollback instruction to at least the first resource management unit and the second resource management unit;

wherein (1) a recovery process activation timeout time+a minimum value of a recovery request communication time<a maximum value of a preparation vote communication time, and (2) a maximum value of the preparation vote communication time<a processing delay time for activating the recovery process are satisfied, and receiving a rollback complete notification from any of the resource management units and in response to receiving the rollback complete notification, delete the rollback as the settlement result in the transaction settlement result log.

8. A distributed transaction management method applied to a distributed transaction system, the distributed transaction management method executed by an information device, the method comprising:

storing, in a storage device, a transaction settlement result log indicating settlement results of transactions of the distributed transaction system;

issuing a preparation instruction of a transaction to each resource management unit;

receiving a recovery request from a first resource management unit of the plurality of resource management units, and in response to the recovery request: record a rollback as a settlement result in the transaction settlement result log and issue a rollback instruction to the first resource management unit;

receiving a preparation vote from a second resource management unit of the plurality of resource management units, and in response to the preparation vote, issue a rollback instruction to at least the first resource management unit and the second resource management unit;

wherein (1) a recovery process activation timeout time+a minimum value of a recovery request communication time<the maximum value of a preparation vote communication time, (2) a maximum value of the preparation vote communication time<the processing delay time for activating the recovery process, and (3) the maximum value of the preparation vote communication time<the recovery process activation timeout time+the minimum recovery request communication time+a log retention time are satisfied, and after a predetermined time has elapsed after the rollback as the settlement result was recorded in the transaction settlement result log, deleting the rollback as the settlement result in the transaction settlement result log k.

* * * * *